United States Patent [19]

Lerner

[11] 4,095,723
[45] Jun. 20, 1978

[54] ARTICLE HANDLING SYSTEM WITH WEIGHT-CONTROLLED DISPENSER

[75] Inventor: Bernard Lerner, Hudson, Ohio

[73] Assignee: Automated Packaging Systems, Inc., Twinsburg, Ohio

[21] Appl. No.: 833,260

[22] Filed: Sep. 14, 1977

Related U.S. Application Data

[63] Continuation of Ser. No. 618,079, Sep. 30, 1975, abandoned.

[51] Int. Cl.² .................................................. B67D 5/14
[52] U.S. Cl. ........................................... 222/56; 222/77
[58] Field of Search .................. 222/55, 58, 66, 56, 222/71, 77, 161, 199; 137/417, 426; 198/533, 554

[56] References Cited

U.S. PATENT DOCUMENTS

| | | | |
|---|---|---|---|
| 2,804,992 | 9/1957 | Peters | 222/55 |
| 2,921,713 | 1/1960 | Zanotto et al. | 222/56 |
| 3,146,910 | 9/1964 | Varner | 222/55 |
| 3,254,729 | 6/1966 | Behlen | 222/55 X |
| 3,334,675 | 8/1967 | Satake | 222/56 X |
| 3,351,238 | 11/1967 | Gilbertson | 222/66 X |
| 3,610,464 | 10/1971 | Loughry | 221/13 X |

*Primary Examiner*—Allen N. Knowles
*Assistant Examiner*—Fred A. Silverberg
*Attorney, Agent, or Firm*—Watts, Hoffmann, Fisher & Heinke Co.

[57] ABSTRACT

In a batch weighing and dispensing system, articles are fed from a supply hopper by a vibratory conveyor to maintain a controlled level of articles in a bowl-shaped feeder hopper. Articles are initially discharged from the feeder hopper through two discharge openings into an accumulator bucket. A weighing unit monitors the weight of articles in the bucket and signals a door to close one of the discharge openings as the weight of articles in the bucket begins to approach a predetermined weight. The weighing unit subsequently signals the feeder hopper drive to slow its feeding action as the weight of articles in the bucket more closely approaches the predetermined weight. Once the predetermined weight is reached, the feeder hopper drive is stopped, and the weighed batch of articles is discharged from the bucket. The feeder hopper discharge openings are arranged near each other at locations where the door-controlled opening will provide a rapid, bulk feed of articles, while the other opening will provide a single-file trickle feed. The weighing unit is supported on a common frame with the feeder and without vibrations hindering operation of the weighing unit.

9 Claims, 31 Drawing Figures

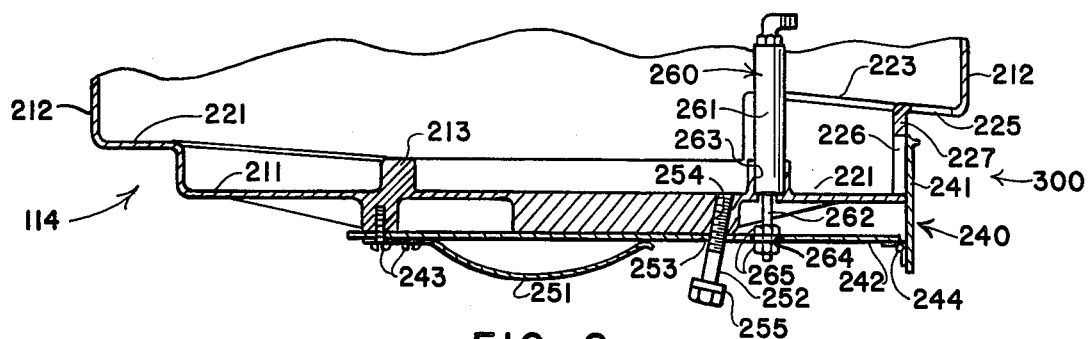
FIG. 8
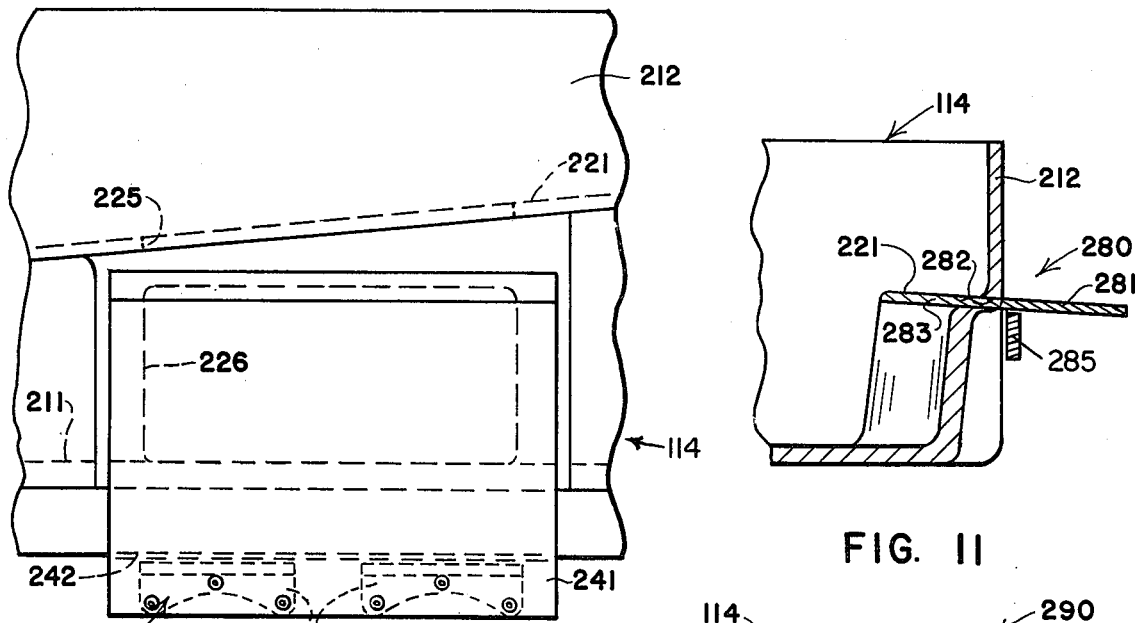
FIG. 9
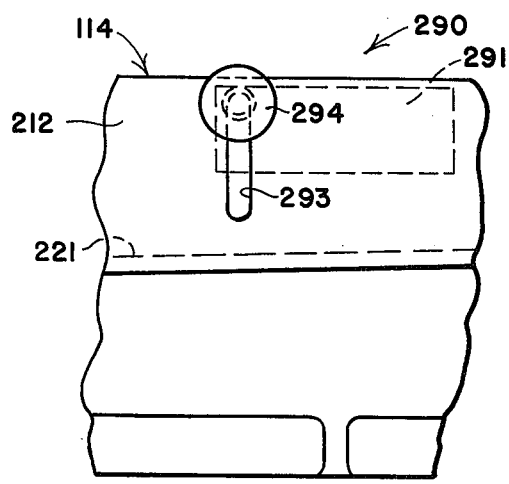
FIG. 11
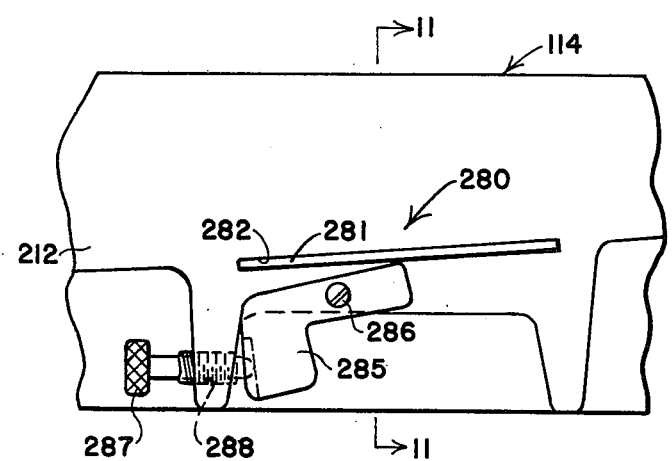
FIG. 10
FIG. 12

ARTICLE HANDLING SYSTEM WITH WEIGHT-CONTROLLED DISPENSER

This is a continuation of application Ser. No. 618,079, filed Sept. 30, 1975, now abandoned.

REFERENCE TO RELEVANT PATENTS AND APPLICATION

"Article Handling System With Dispenser", Ser. No. 618,025, filed concurrently, by Bernard Lerner.

"Article Handling Apparatus With Automatic Controls for Supply and Dispenser", U.S. Pat. No. 3,610,464 issued Oct. 5, 1971, here the "Dispenser Patent".

"Packaging Method and Apparatus", U.S. Pat. No. 3,815,318 issued June 11, 1974, here the "Packaging Machine Patent".

BACKGROUND OF THE INVENTION

1. Field of the Invention

The present invention relates generally to material handling apparatus, and more particularly to apparatus for rapidly, accurately and repetitively dispensing batches of articles of predetermined weight.

2. Prior Art

Articles are frequently packaged in batches of predetermined weight. Due to the number and diversity of small articles which are packaged in weighed batches, apparatus capable of rapidly, accurately, and automatically dispensing successive weighed batches of articles is in demand.

Previously proposed apparatus for dispensing weighed batches of articles have suffered one or more of the drawbacks of inadequate operating speed, weighing inaccuracy and/or inconsistency, vibration sensitivity, and lack of versatility in handling differing types of articles and article weights.

While proposals have been made to use vibratory feeding systems to deliver articles to a weighing or counting apparatus, problems have been encountered in successfully implementing such proposals. One problem has been that of stopping the feed of articles into the weighing or counting apparatus immediately after a predetermined weight or count of articles has accumulated. Often some articles have already begun discharging from the vibratory feeding equipment into the weigher or counter at the time a desired weight or count of articles has accumulated. In some systems, efforts are made to divert such tardily discharging articles into an overfeed receptacle from which they are returned to the vibratory feeder. There are instances when the tardily discharging articles enter the weigher or counter and cause the accumulated batch to have an excessively large weight or count.

Proposals to overcome this problem of weighing or counting inaccuracy attempted to feed articles into an accumulator bucket at an initially high feed rate to bring the weight of articles rapidly toward a desired amount. When the weight was close to the desired amount, the feed rate was reduced until the targeted amount was achieved. Such proposals have achieved some improvements in article handling speed and accuracy. An apparatus of this type is described in the referenced Dispenser Patent. These proposed systems have often required two or more independently operating feeder systems.

A problem encountered where vibratory feeding equipment is used with weighing apparatus has been that the operation of the weighing apparatus is adversely affected by vibrations generated in the feeding equipment. Separate, relatively massive vibration isolating mounting systems have been used to support the feeder and the weighing equipment in an effort to reduce vibration-caused weighing errors.

Where vibrations are transmitted from vibratory feeding equipment to a weighing apparatus, the time required to weigh a quantity of articles has often had to be extended to assure accuracy. In some weighing systems, article weight is determined by integrating sensed weight over an interval of time as long as several seconds to improve accuracy. The extended weighing time required by such systems necessitates correspondingly slow feeder rates and the speed of operation of such systems is undesirably slow.

While some prior systems are reasonably effective in handling articles of a given size and weight for dispensing within a given range of article accumulation weights, these systems are often not well adapted to handle articles of significantly different sizes and weights and/or significantly smaller or larger article accumulation weights.

Another problem with prior apparatuses is that the collection buckets employed in their weighing systems typically overlie or nearly overlie other supporting or operating components of the apparatus. Stated in other terms, the weighing buckets of self supporting apparatuses which do not have to be anchored to a supporting surface have an inadequate overhang in relation to nearby apparatus components to permit a direct discharge from such buckets into conveyors, packaging equipment and the like. Special chutes must accordingly be constructed to interface proposed apparatuses with such receptacles and other equipment.

SUMMARY OF THE INVENTION

The present invention overcomes the foregoing and other drawbacks of the prior art and provides an apparatus capable of rapidly, accurately, repetitively and automatically dispensing weighed batches of articles.

Articles from a supply hopper are fed to a bowl-shaped feeder hopper to maintain a controlled level of articles in the feeder hopper. In the initial part of a feed cycle, articles are discharged from the feeder hopper through two discharge openings into an accumulator bucket. A weighing unit monitors the weight of articles in the bucket and signals a door to close one of the discharge openings as the weight of articles in the bucket begins to approach a predetermined weight. The weighing unit subsequently signals the feeder hopper drive to slow its feeding action as the weight of articles in the bucket more closely approaches the predetermined weight. Once the predetermined weight is reached, the feeder hopper drive is stopped and the weighed batch of articles is discharged from the bucket.

One feature of apparatus embodying the present invention is the geometry of its arrangement which locates the accumulator bucket with a substantial overhang in relationship to other components of the apparatus. The bucket can, by virtue of this feature, discharge directly into large containers or conveyors or packaging apparatus without requiring special chutes or other structure to effect an interface.

The advantageous arrangement of components includes a substantially in-line positioning of the supply hopper, the feeder hopper, a hopper-to-hopper vibratory conveyor, and the accumulator bucket. These in-line components are supported at a location between the supply hopper and the accumulator bucket such that the bucket is suspended in cantilevered fashion. Even though the bucket is suspended in cantilevered fashion, this arrangement of components provides a counterbalanced apparatus that is self-supporting and does not have to be secured to a mounting surface to maintain its stability.

An additional feature resides in a modular construction of the apparatus which facilitates servicing and replacement with minimal machine "down" time. The supply hopper, the vibratory conveyor, the feeder hopper drive, the feeder hopper, the weighing unit and the accumulator bucket each form separable modules that can be removed and replaced in minimal "down" time. An advantage of this modular construction is that the apparatus of the present invention can easily be converted from a batch weighing system to a batch counting system of the type described in the referenced Counting System Patent.

Another feature of the apparatus is the provision of both a lower "bulk feed" and an upper "dribble feed" discharge opening in a single feeder hopper. The feeder hopper is of substantially conventional bowl-shape and includes an inclined ramp that spirals upwardly along the inside of the hopper sidewall toward the upper discharge opening. The lower discharge opening is formed through the sidewall of the feeder hopper at a location immediately below the upper discharge opening. The discharge opening is tangential to the circumference of the bowl.

A power-operated closure system selectively opens and closes the lower opening to permit an initial bulk discharge of articles from the hopper bowl. Since the lower discharge opening is tangential to the sidewall of the bowl, the closure of the lower opening does not distrub the movement of articles in the feeder bowl. Following a bulk discharge of articles from the lower opening, a dribble or trickle feed discharge of articles is continued from the upper discharge opening. As the weight of articles in the bucket closely approaches a desired predetermined weight, the operation of the vibratory feeder is slowed to slow the dribble feed rate. The dribble feed rate is continued until the desired batch weight is obtained, whereupon feeder operation is stopped.

The presence of both bulk and dribble feed discharge systems gives the apparatus of the present invention a degree of versatility not present in prior proposals. Where only a small quantity of articles is to be accumulated in each batch, the bulk discharge opening is kept closed and only the dribble feed discharge system is used. Where each weighed batch is to include a large number of articles, combined operation of the bulk and dribble discharge systems is employed, as described, to provide a rapid accumulation of the requisite number of articles for each weighed batch.

The power-operated closure system associated with the bulk discharge opening features a door that closes with an upward movement. The upward closure movement has been found to be advantageous in preventing articles from being jammed between the door and portions of the feeder hopper which define the bulk discharge opening.

It is important to maintain a controlled level of articles in the feeder hopper to assure proper, consistent feeding. Since articles are fed at high rates directly from the floor of the feeder hopper through a lower discharge opening, the level of articles in the feeder hopper can be reduced very quickly.

Another feature of the present invention lies in a novel level switch assembly used to adjustably set the level of articles in the feeder hopper. The level switch assembly and the components it controls maintain the level in the feeder hopper substantially constant even during both feed operations.

The level switch assembly includes a counterbalanced, pivotally mounted wiper arm that engages the upper surfaces of articles in the feeder hopper. A sensing potentiometer is connected to the wiper arm such that its resistance varies in response to changes in the level of articles in the feeder hopper. A manually adjustable reference potentiometer provides a reference resistance indicative of a desired level to be maintained in the feeder hopper. Comparison circuitry compares input signals from these two potentiometers and provides an output signal to initiate operation of the hopper conveyor when the level of articles in the feeder hopper is below the desired level. An indicator light is located on the level switch housing and lights when a lower than desired level is sensed to assist the operator in setting a desired level on the manually adjustable potentiometer.

Other features of the invention lie in the provision of a weighing unit which can be mounted on the same supporting structure with vibratory feeding equipment without being adversely affected by vibrations. The weighing system includes a simple balance beam linkage that supports a coil and the accumulator bucket on opposite ends of a balance beam. The power supplied to the coil is controlled to generate such balancing forces as are required to maintain the balance beam in a predetermined position. Light from a light-emitting diode is reflected from a movable reference surface connected to the blance beam and is detected by a photocell to signal when the balance beam has moved from its predetermined position. The signal from the photocell is used to adjust the power supplied to the coil to counterbalance the weight of articles in the accumulator bucket. The weighing unit effectively electronically damps any tendency of the accumulator bucket to vibrate, thereby permitting a rapid, nearly instantaneous weighing of articles in the bucket.

It is a general object to provide a novel and improved batch weighing and dispensing system.

It is another object to provide an improved vibratory feeder with a pair of discharge openings communicating with a single feeder hopper to selectively provide bulk and dribble discharge of articles from the hopper.

These and other objects and a fuller understanding of the invention may be had by referring to the following description and claims taken in conjunction with the accompanying drawings.

BRIEF DESCRIPTION OF THE DRAWINGS

FIG. 8 is a sectional view as seen from a plane indicated by a line 8—8 in FIG. 6;

FIGS. 9, 10 and 12 are enlarged side elevational views as seen from planes indicated by lines 9—9, 10—10, and 12—12 in FIG. 6;

FIG. 11 is a sectional view as seen from a plane indicated by a line 11—11 in FIG. 10;

DESCRIPTION OF THE PREFERRED EMBODIMENT

Figure 1:
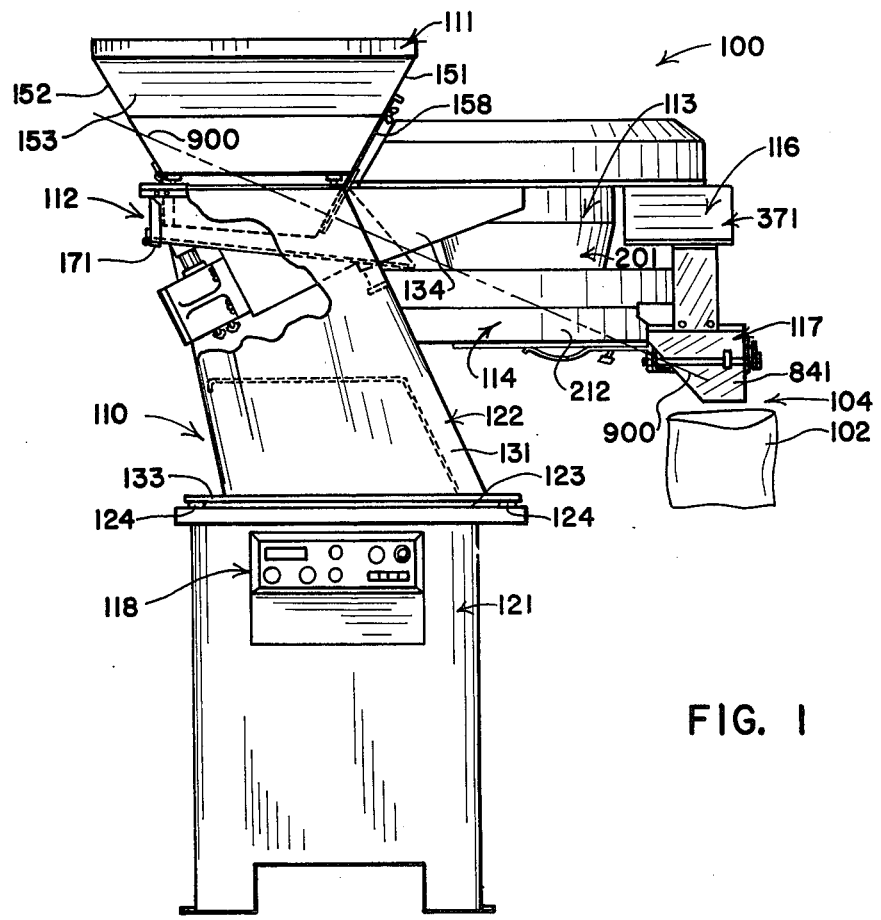
FIG. 1 is a side elevational view of an apparatus embodying the preferred practice of the invention with some portions of the apparatus broken away to illustrate the arrangement of other portions.
Figure 2:
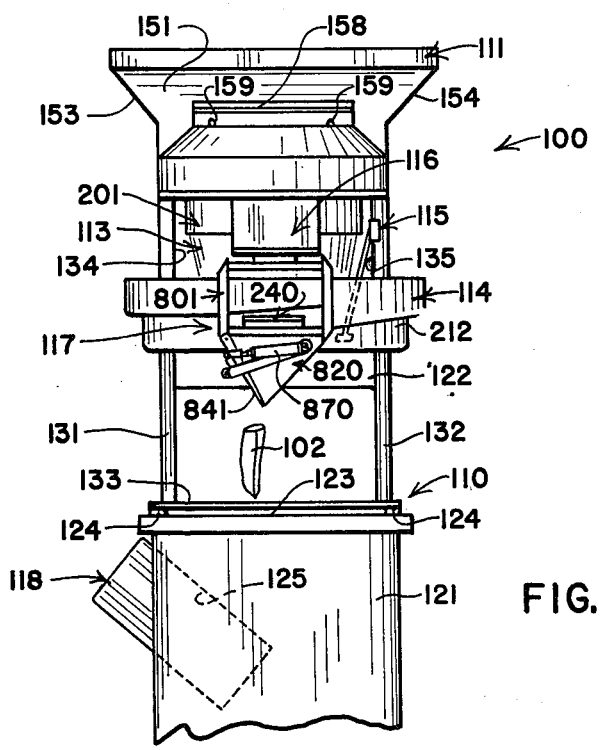
FIG. 2 is a front elevational view of a portion of the apparatus of FIG. 1.

Referring to FIGS. 1 and 2, an article handling apparatus embodying the preferred practice of the present invention is indicated by the numeral 100. The apparatus 100 is operable to dispense articles, such as pills, washers, screws, or radishes into a container 102 positioned at a loading station 104. Where the container 102 is a bag connected to a packaging web, the container 102 is preferably supported and positioned at the loading station 104 by a packaging machine of the type described in the referenced Packaging Machine Patent.

The apparatus 100 includes a base structure 110 which supports a supply hopper 111, a vibratory conveyor 112, a vibratory feeder 113, and a weighing unit 116. The vibratory feeder 113 includes a feeder hopper 114. The weighing unit 116 includes an accumulator bucket 117. In operation, articles to be dispensed are loaded into the supply hopper 111. The vibratory conveyor 112 feeds articles from the supply hopper 111 into the feeder hopper 114. The vibratory feeder 113 feeds articles from the feeder hopper 114 into the accumulator bucket 117. The operation of the vibratory conveyor 112 is controlled by a signal from a limit switch assembly 115 to maintain a predetermined level of articles in the feeder hopper 114. The operation of the vibratory feeder 113 is controlled by a signal from the weighing unit 116 to dispense a predetermined quantum of articles into the bucket 117. After the requisite quantum of articles has accumulated in the bucket 117, the articles are dispensed into the container 102. A control unit 118 monitors operation of the weighing unit 116.

THE BASE STRUCTURE 110

The base structure 110 includes a four-legged stand 121 and a frame 122 supported atop the stand 122. A horizontal support surface 123 is defined at the upper end of the stand. Elastomeric leg cushions 124 depend from the frame 122 and engage the support surface 123. A compartment 125 is defined in one side of the stand 121 to support the control unit 118. In installations where it is necessary to position the apparatus 100 on an existing table or other suitable support, the stand 121 can be removed and the control unit 118 positioned beside the frame 122 on a table or other support.

Figure 3:
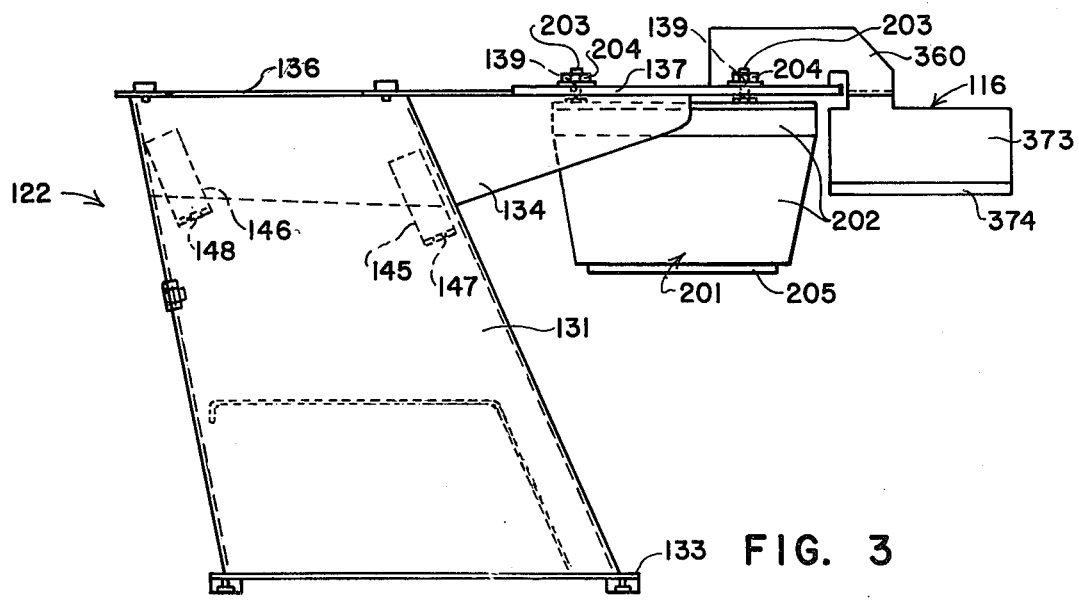
FIGS. 3-5 are enlarged side elevational views of portions of the apparatus of FIG. 1.

Referring to FIGS. 1-3, the frame 122 is a welded assembly including a pair of side members 131, 132 which extend upwardly from a bottom plate 133. The side members 131, 132 are inclined and extend rearwardly (leftwardly as viewed in FIG. 3) as they extend upwardly. A pair of bracing plates 134, 135 are welded to inside surfaces of the side members 131, 132 and extend forwardly near the upper ends of the side members 131, 132. A relatively thin hopper support plate 136 is welded to the side members 131, 132 and to the bracing plates 134, 135 near rearward ends of the bracing plates. A relatively thick feeder support plate 137 is welded to the bracing plates 134, 135 near forward ends of the bracing plates. A hole, not shown, is formed through the central region of the hopper support plate 136 to permit portions of the supply hopper 111 to extend through the plate 136. Mounting holes 139 are formed through the feeder support plate 137.

Forward and rearward pairs of mounting brackets 145, 146 are welded on inner surfaces of the bracing plates 134, 135. Inwardly turned flanges 147, 148 are formed near the lower ends of the mounting brackets 145, 146.

The Supply Hopper 111

Figure 4:
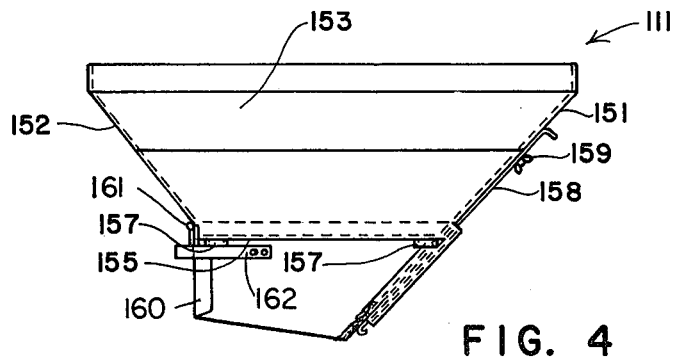

Referring to FIGS. 1, 2 and 4, the supply hopper 111 has inclined forward and rearward walls 151, 152 interconnected by side walls 153, 154. The side walls 153, 154 have horizontally extending portions 155 which overlie portions of the hopper support plate 136. Elastomeric mounts 157 are interposed between these side wall portions 155 and the hopper support plate 136 to resiliently mount the supply hopper 111 on the frame 110.

The supply hopper 111 operates in the manner of a funnel to feed articles into the vibratory conveyor 112. The top of the hopper 111 is open to receive articles. The bottom of the hopper 111 is open to deliver articles into the vibratory conveyor 112. An adjustable gate 158 is carried on the forward wall 151 and depends to an adjustable depth into the conveyor 112 to regulate the flow of articles forwardly along the conveyor 112. Threaded fasteners 159 having wing heads adjustably position the gate 158.

An access door 160 is provided near the lower end of the rearward hopper wall 152. A hinge 161 pivotally mounts the door 160 permitting it to swing upwardly to an open position shown in phantom in FIG. 4. A pair of latching arms 162 are riveted to the side walls 153, 154 and operate to releasably retain the door 160 in the closed position shown in FIG. 4.

The Vibratory Conveyor 112

Figure 5:
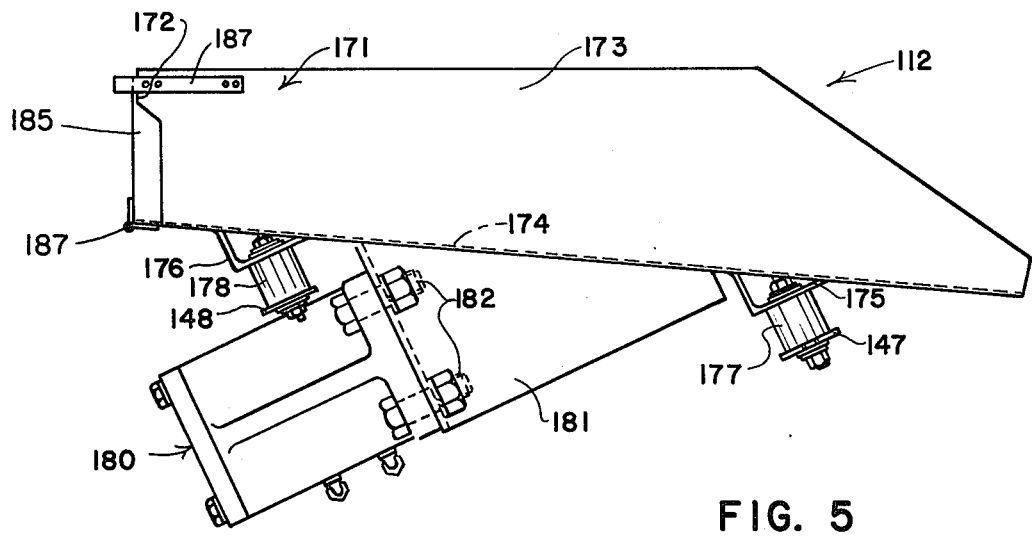

Referring to FIGS. 1, 2 and 5, the vibratory conveyor 112 includes a movably supported trough 171. The trough 171 has a pair of side walls 173, and a bottom wall 174. Forward and rearward mounting brackets 175, 176 are welded to the underside of the bottom wall 174. Forward and rearward elastomeric spacers 177, 178 are interposed between the mounting bracket flanges 147, 148 and the mounting brackets 175, 176 to resiliently mount the trough 171 on the frame 122.

A conventional pneumatically powered vibratory motor 180 is provided to cyclically drive the trough 171 and thereby move articles forwardly, from left to right as viewed in FIG. 5, along the trough 171. A vibrator mounting bracket 181 is welded to the bottom wall 174. Threaded fasteners 182 secure the vibratory motor 180 to the bracket 181.

An access door 185 is provided at the rear end of the trough 171. A hinge 186 pivotally mounts the door 185 permitting it to swing downwardly to an open position shown in phantom in FIG. 5. A pair of latching arms 187 are riveted to the sidewalls 173 and operate to releasably retain the door 185 in the closed position shown in FIG. 5.

When the doors 160, 185 are both opened, access can be had to the bottom region of the hopper 111 and to the rearward region of the trough 171 to permit an operator to clean articles out of the hopper 111 and out of the conveyor 112. Without the provision of the doors 160, 185, articles could only be cleaned out of these regions by processing them through the remainder of the apparatus 100.

The Vibratory Feeder 113

Referring to FIGS. 1 and 3, the vibratory feeder 113 includes a motor drive assembly 201. The drive assembly 201 has a housing 202 which encloses a conventional vibratory motor, not shown. Threaded fasteners 203 extend through resilient damper bushings 204 and through the mounting holes 139 to mount the housing 202 on the underside of the feeder support plate 137. An armature 205 depends below the housing 202 for connection to the feeder hopper 114. The motor drive assembly 201 is operable, when energized, to vibrate the armature 205 at a 60-cycle-per-second frequency in response to a 60-cycle electrical power supply. The amplitude of armature vibration is determined by the magnitude of the power supplied to the vibratory motor. The speed at which articles are fed by the feeder hopper 114 increases and decreases with increases and decreases in the vibration amplitude of the armature 205.

The Feeder Hopper 114

Figure 6:
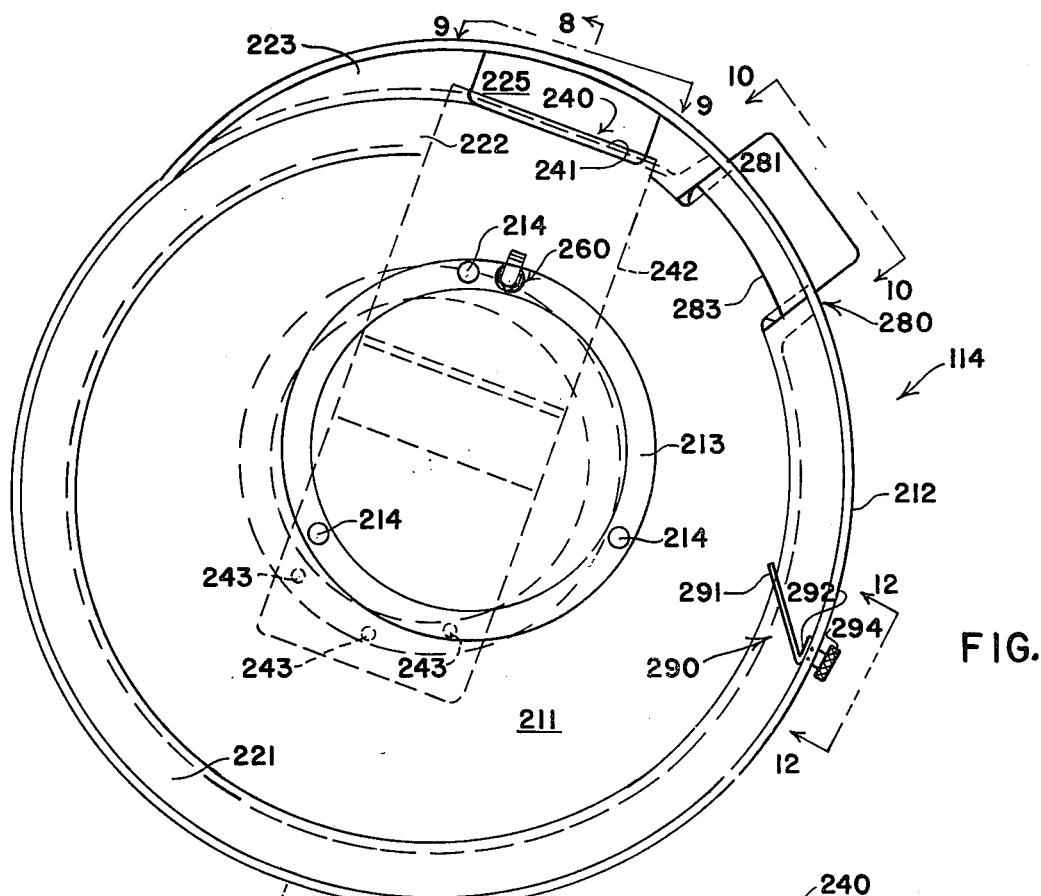
FIGS. 6 and 7 are enlarged top and bottom plan views of a feeder hopper employed in the apparatus of FIG. 1.
Figure 7:
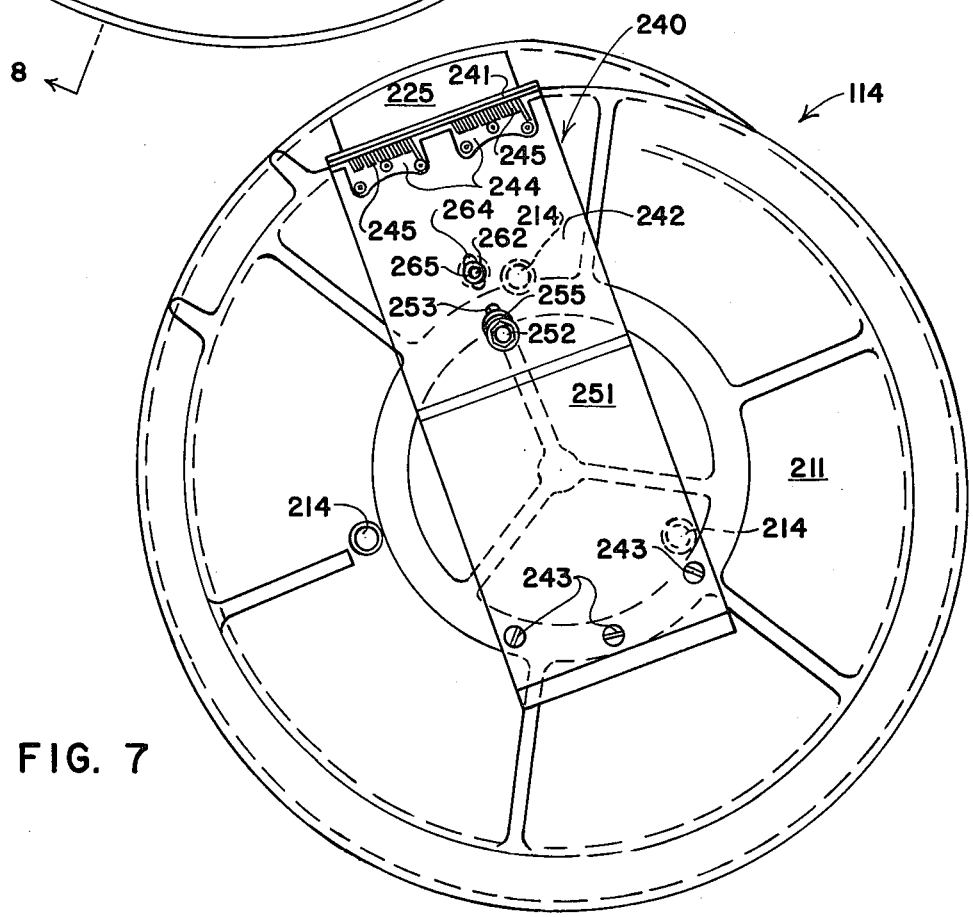

Referring to FIGS. 6 and 8, the feeder hopper 114 is a round, bowl-like structure having a bottom wall 211 and an upstanding side wall 212. An annular rib 213 projects upwardly into the hopper 114 from the bottom wall 211. Three bolt holes 214 are formed through the rib 213. Threaded fasteners, not shown, extend through the holes 214 and mount the feeder hopper 114 on the armature 205. The hopper side wall 212 forms a spiral ramp 221 that extends circumferentially inside the hopper 114. The ramp 221 has a lower end 222 that extends in the same plane as the bottom wall 211. From the lower end 222, the ramp 221 extends upwardly at a small, uniform angle of inclination to an upper end 223.

When the feeder armature 205 is vibrated, the articles in the feeder hopper 114 will move upwardly along the ramp 221 from the lower end 222 toward the upper end 223.

Referring to FIG. 8, a discharge station 300 is defined by upper and lower discharge openings 225, 226. The openings 225, 226 are formed through the hopper side wall 212 for discharging articles from the hopper 114 into the accumulator bucket 117. The upper discharge opening 225 is formed through the floor of the ramp 221 near the upper ramp end 223. The lower discharge opening 226 is formed through an upstanding portion of the side wall 212 adjacent the bottom wall 211. The openings 225, 226 are separated from each other by only a narrow segment 227 of the side wall 212. The upper opening 225 remains open at all times to discharge articles moving along the ramp 221 toward the upper ramp end 223. The lower discharge opening 226 is selectively opened and closed by a closure assembly 240.

Referring to FIGS. 6-9, the closure assembly 240 includes a door 241 supported for vertical movement at a location outside the hopper 114. A mounting plate 242 underlies the feeder hopper 114 and is secured to the hopper 114 by threaded fasteners 243. A pair of hinges 244 connect the forward end of the mounting plate 242 to the lower end of the door 241. The hinges 244 carry springs 245 which bias the door 241 counterclockwise, as viewed in FIG. 8, into engagement with such portions of the side wall 212 as surround the lower discharge opening 226.

Referring to FIG. 8, a biasing plate 251 underlies rearward portions of the mounting plate 242 and is clamped into engagement with the mounting plate 242 by the fasteners 243. The biasing plate 251 biases the mounting plate 242 and the door 241 upwardly toward a position where the door 241 closes the lower discharge opening 226.

Downward movement of the mounting plate 242 and the door 241 is limited by a stop bolt 252. The stop bolt 252 extends through a slot 253 formed in the mounting plate 242 and is threaded into a hole 254 formed in the bottom wall 211. A resilient washer 255 is carried near the head of the bolt 252. The resilient washer 255 engages the mounting plate 242 when the mounting plate 242 is in its lowermost position where the door 241 opens the lower discharge opening 226.

A fluid-operated cyclinder 260 is provided to open and close the door 241. The cylinder 260 has a cylindrical housing 261 and an extensible piston rod 262. A hole 263 is formed in the rib 213 to receive and mount the lower end of the housing 261. The piston rod 262 depends through the bottom wall 211 and through a slot 264 formed in the mounting plate 242. A pair of lock nuts 265 are threaded onto the lower end of the piston rod 262 and serve to couple the piston rod 262 to the mounting plate 242. When the piston rod 262 extends from the housing 261 in response to a supply of pressurized fluid to the cylinder 260, the mounting plate 242 is moved downwardly causing the door 241 to open the lower discharge opening 226. When the piston rod 262 retracts toward the position shown in FIG. 8, the mounting plate 242 and the door 241 move upwardly to a position where the door 241 closes the lower discharge opening 226.

Two flow control devices are provided inside the feeder hopper 114 to restrict the flow of articles along the ramp 221 upstream from the lower discharge opening 226. Referring to FIG. 6, one of the flow control devices is indicated by the numeral 280 and defines a ramp section of controlled width to limit the width of a stream of articles flowing toward the upper opening 225. The other of the flow control devices is indicated by the numeral 290 and operates to limit the depth of a stream of articles flowing toward the upper opening 225.

Referring to FIGS. 6, 10 and 11, the flow restrictor 280 includes a movable gating plate 281 which can be positioned to selectively increase or decrease the width of the ramp 221 in the region of the assembly 280. The gating plate 281 extends through a slot 282 formed in the hopper side wall 212. The gating plate 281 has a curved inner end 283. The position of the curved inner end 283 determines the effective width of the ramp 221 provided by the gating plate 281. A narrower ramp width, as provided by the plate 281, will permit a lesser number of articles to flow toward the upper discharge opening 225 than will a wider ramp width.

Referring to FIG. 10, an L-shaped clamping arm 285 is provided to hold the gating plate 281 in position. A threaded fastener 286 extends loosely through a hole formed in the arm 285 and is threaded into the hopper side wall 212 to pivotally mount the clamping arm 285 on the hopper 114. A knurled thumb screw 287 is threaded through a hole 288 formed in the hopper side wall 212 and engages the lower leg of the L-shaped clamping arm 285. The upper leg of the clamping arm 285 is biased by the thumb screw 287 into engagement with the underside of the gating plate 281. The gating plate 281 is easily repositioned in the slot 282 once the thumb screw 287 has been loosened to relieve the clamping action of the arm 285.

Referring to FIGS. 6 and 12, the flow depth regulator assembly 290 includes a wiper member 291 which is movably supported on the hopper side wall 212 at a position downstream from the flow restriction assembly 280 to limit the depth of the flow of articles along the ramp 221. The wiper member 291 extends inwardly from the side wall 212 and operates to deflect an excessive flow of articles back onto the bottom wall of the hopper 114.

A threaded fastener 292 has its head secured to the wiper member 291. A threaded stem of the fastener 292 extends through a slot 293 formed in the hopper side wall 212 and is received in a knurled nut 294. When the nut 294 is loosened, the fastener 292 can be moved upwardly or downwardly in the slot 293 to position the wiper member 291. Once the wiper member 291 is positioned to properly limit the depth of flow of articles along the ramp 221, the nut 294 is tightened to secure the wiper member 291 in position.

The Level Switch Assembly 115

Figure 13:
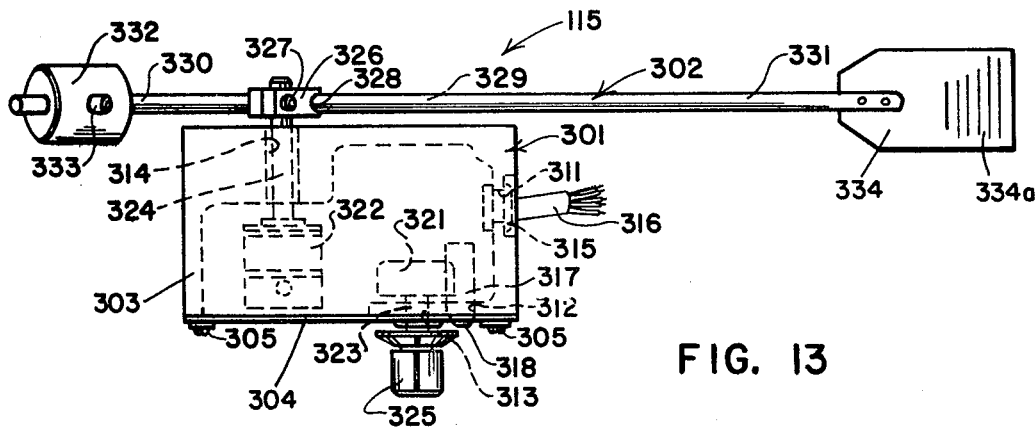
FIG. 13 is an enlarged top plan view of a limit switch assembly employed in the apparatus of FIG. 1.
Figure 14:
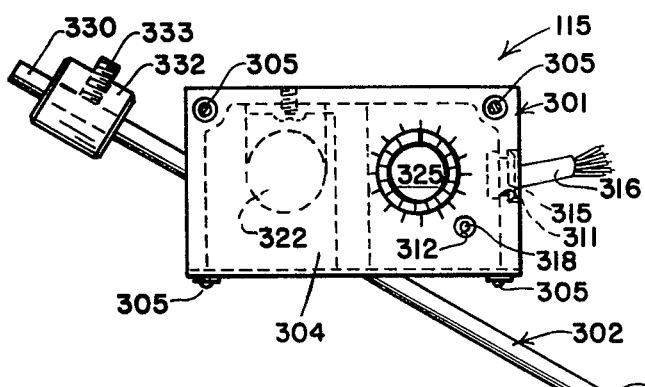
FIG. 14 is a side elevational view of the assembly of FIG. 13.

Referring to FIGS. 2, 13 and 14, the level switch assembly 115 includes a generally rectangular housing 301 and a paddle assembly 302 which depends into the feeder hopper 114. A bracket, not shown, supports the housing 301 on the frame side plate 135.

The housing 301 includes a casing 303 and a cover plate 304. Threaded fasteners 305 secure the cover plate 304 on the casing 303. Four holes 311, 312, 313, 314 are formed through sidewalls of the housing 301. A resilient grommet 315 is positioned in the hole 311 and guides a multi-conductor electrical cable 316 through one sidewall of the housing 301. A socket assembly 317 is supported in the hole 312 and includes a light generating element 318 viewable from outside the housing 301.

A pair of potentiometers 321, 322 are mounted inside the casing 303. The potentiometers 321, 322 have rotatable stems 323, 324 which extend through the holes 313, 314. A rotatable knob 325 is mounted on the stem 323 of the potentiometer 321. A paddle mounting bracket 326 is mounted on the stem 324 of the potentiometer 322. A set screw 327 secures the bracket 326 to the stem 324. A hole 328 is formed through the bracket 326.

The paddle assembly 302 includes an elongated paddle support rod 329. The rod 329 extends through the bracket hole 328 and has upper and lower end regions 330, 331. A balance weight 332 is carried on the upper end region 330. A set screw 333 secures the weight 332 in place on the rod 329. A wiper blade 334 is riveted to the lower end region 331. The wiper blade 334 has a rounded end region 334A and is configured to provide minimal obstruction to articles passing beneath it along the bottom wall 211 of the feeder hopper 114 in directions indicated by arrows 335.

The balance weight 332 is positioned on the rod 329 at a location where the weight of the lower end region 331 is largely counterbalanced. The weight 332 is positioned such that the wiper blade 334 is biased very gently by the weight of the lower end region 331 into engagement with upper surfaces of articles moving in directions indicated by the arrows 335. The balance arm assembly 302 is, therefore, positioned, by virtue of the engagement of the wiper blade 334 with articles in the feeder hopper 114, in an attitude indicative of the level of articles in the hopper 114. The resistance of the potentiometer 322 varies as a function of the actual level of articles in the hopper 114.

Figure 14A:
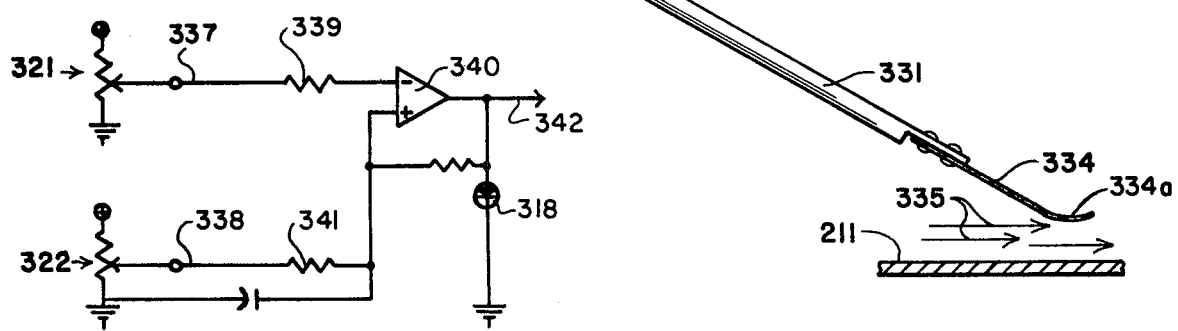
FIG. 14a is a schematic electrical circuit diagram of circuitry associated with the assembly of FIG. 13.

Referring to FIG. 14a, the potentiometer 321 produces a reference signal on a lead 337 as a function of the position of the knob 325. This reference signal is indicative of the desired level of articles in the feeder hopper 114. The potentiometer 322 produces a voltage signal on a lead 338 indicative of the actual level of articles in the feeder hopper 114.

The reference signal on the lead 337 is transmitted through a resistor 339 to the inverting input of an operational amplifier 340. The level signal on the lead 338 is transmitted through a resistor 341 to the noninverting input of the operational amplifier 340.

The amplifier 340 compares the reference signal and the sensed level signal and provides an output signal on a lead 342. The output signal on the lead 342 is relatively high when the sensed level signal on the lead 338 is greater than the reference signal on the lead 337. The output signal on the lead 342 is relatively low when the sensed level signal on the lead 338 is less than the reference signal on the lead 337.

The output signal on the lead 342 is used to control the operation of the vibratory conveyor motor 180 and to energize the light generating element 318. The light generating element 318 is a light emitting diode connected as shown in FIG. 14a to light only when the output of the amplifier 340 is relatively high to indicate a condition where the actual level of articles in the feeder hopper 114 is below the desired reference level. The vibratory conveyor motor 180 is energized concurrently with the lighting of the element 318, and is de-energized concurrently with the element 318 when the sensed actual level of articles in the feeder hopper is at or above the predetermined reference level.

The multi-conductor cable 316 supplies power to the circuitry shown in FIG. 14a and transmits the output signal on the lead 342 to a suitable conventional controller, not shown, for operating the conveyor drive motor 180.

The Weighing Unit 116

Referring to FIG. 3, a weighing unit support bracket 360 is mounted atop the feeder support plate 137. The bracket 360 extends forwardly of the support plate 137 and supports the weighing unit 116.

Referring to FIGS. 1, 15–17, the weighing unit 116 includes a weight responsive signalling system 370 supported in a housing assembly 371. The signalling system 370 includes an armature 372. The accumulator bucket 117 is connected to and supported by the armature 372, as will be explained. As articles are discharged from the feeder hopper 114 into the accumulator bucket 117, the weight of such articles increases the downward force applied by the accumulator bucket 117 to the armature 372. The signalling system 370 senses the increase in force applied to the armature 372 and provides an output signal representative of the weight of articles in the accumulator bucket 117.

The housing assembly 371 includes a downwardly opening cover structure 373 which is bolted to the support bracket 360. The housing assembly 371 additionally includes a base structure 374 which closes the bottom of the cover structure ture 373 and supports the components of the signalling system 370. Threaded fasteners 375 connect the base structure 374 and the cover structure 373.

A closed chamber 380 is defined inside the housing assembly 371. A breather hole 381 is formed through the top wall of the cover structure 373. A breather fitting 382 is threaded into the hole 381 to assure that air pressure in the chamber 380 equals ambient air pressure. A connection opening 385 is formed through the base structure 374. A flexible diaphragm 386 is positioned across and closes the opening 385. A clamping ring 387 perimetrically clamps the diaphragm 386 against such portions of the base structure 374 as surround the opening 385. Threaded fasteners 388 extend through holes formed in the clamping ring 387 and are threaded into aligned holes formed in the base structure 374.

Figure 17:
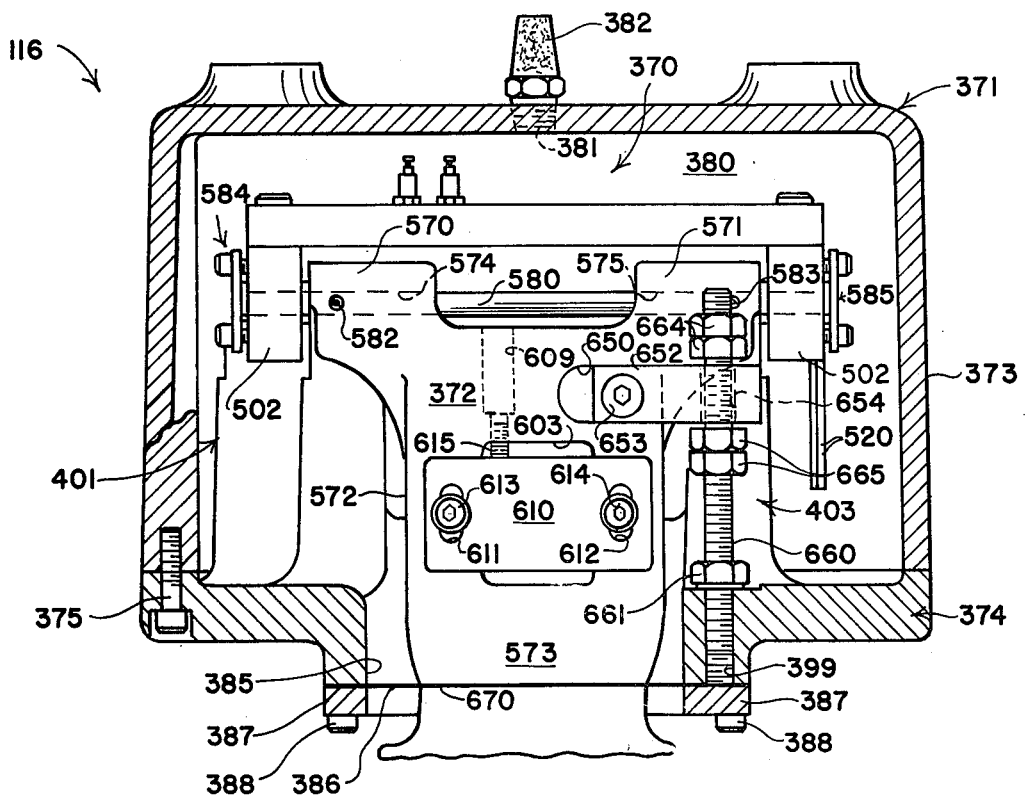

Referring to FIG. 17, a threaded vertically extending hole 399 is formed in the base structure 374 near the connection opening 385. The diaphragm 386 and the clamping ring 387 close the lower end of the hole 399.

Figure 20:
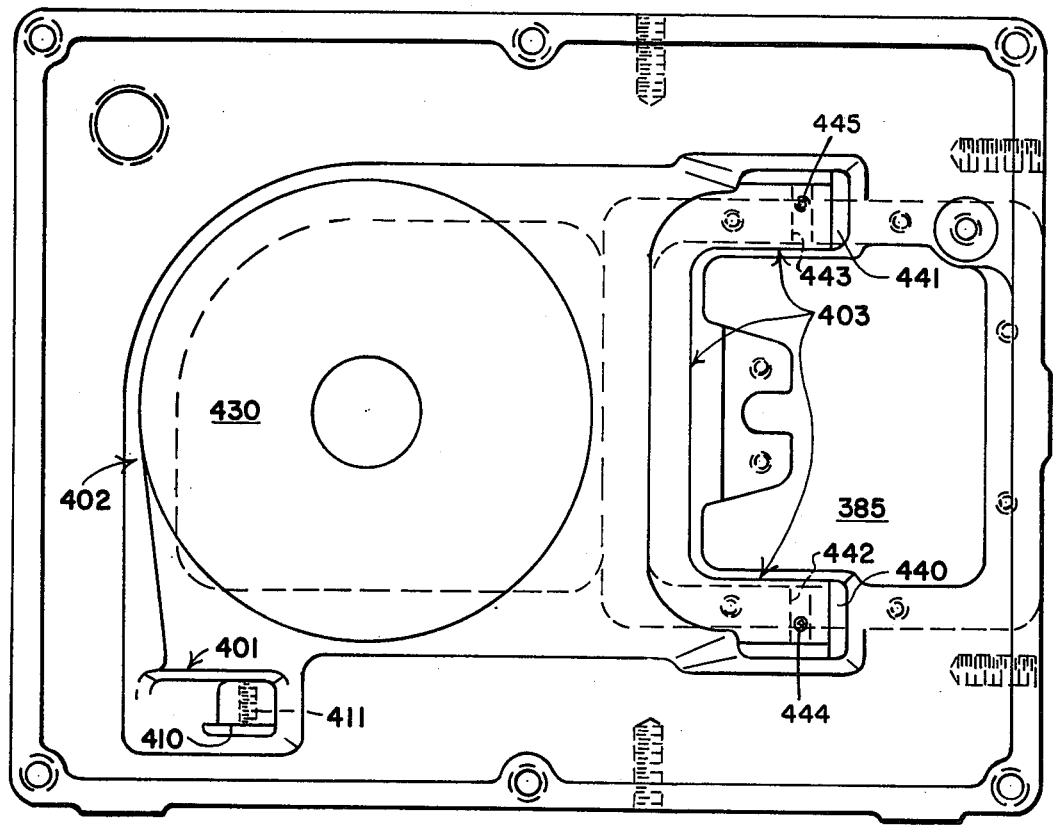
FIG. 20 is a top plan view of a base plate employed in the assembly of FIG. 15.
Figure 21:
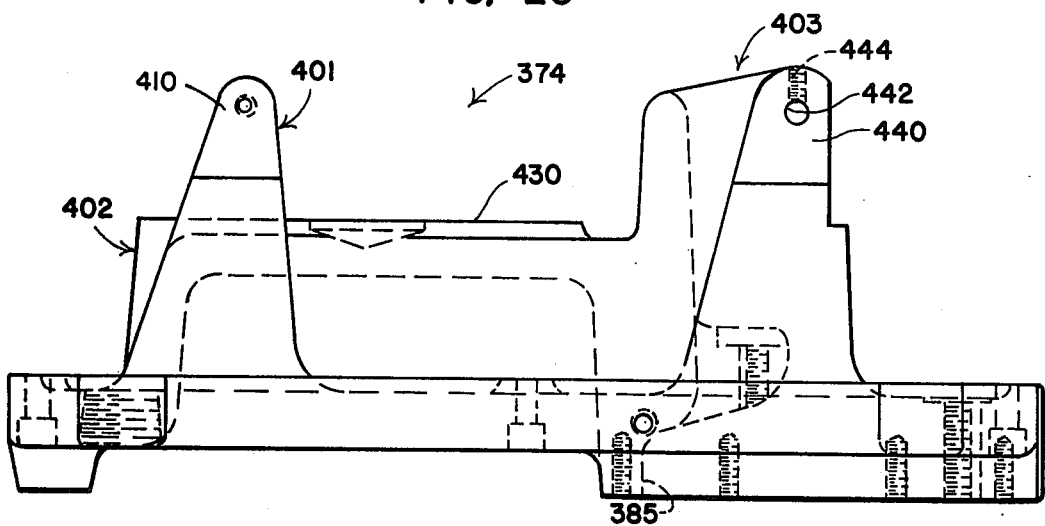
FIGS. 21 and 22 are side elevational views of the base plate of FIG. 20.

Referring to FIGS. 20–21, the base structure 374 has several formations which project upwardly into the chamber 380. One of these formations is a projection 401 which will be referred to as a sensor mounting projection. Another of the formations is a projection 402 which will be called the magnet mounting projection. Still another formation is a U-shaped projection 403 which is called the balance beam mounting projection.

The sensor mounting projection 401 has a machined, vertically extending mounting surface 410. A threaded hole 411 is formed through the projection 401 and extends in a direction perpendicular to the plane of the mounting surface 410.

Figure 15:
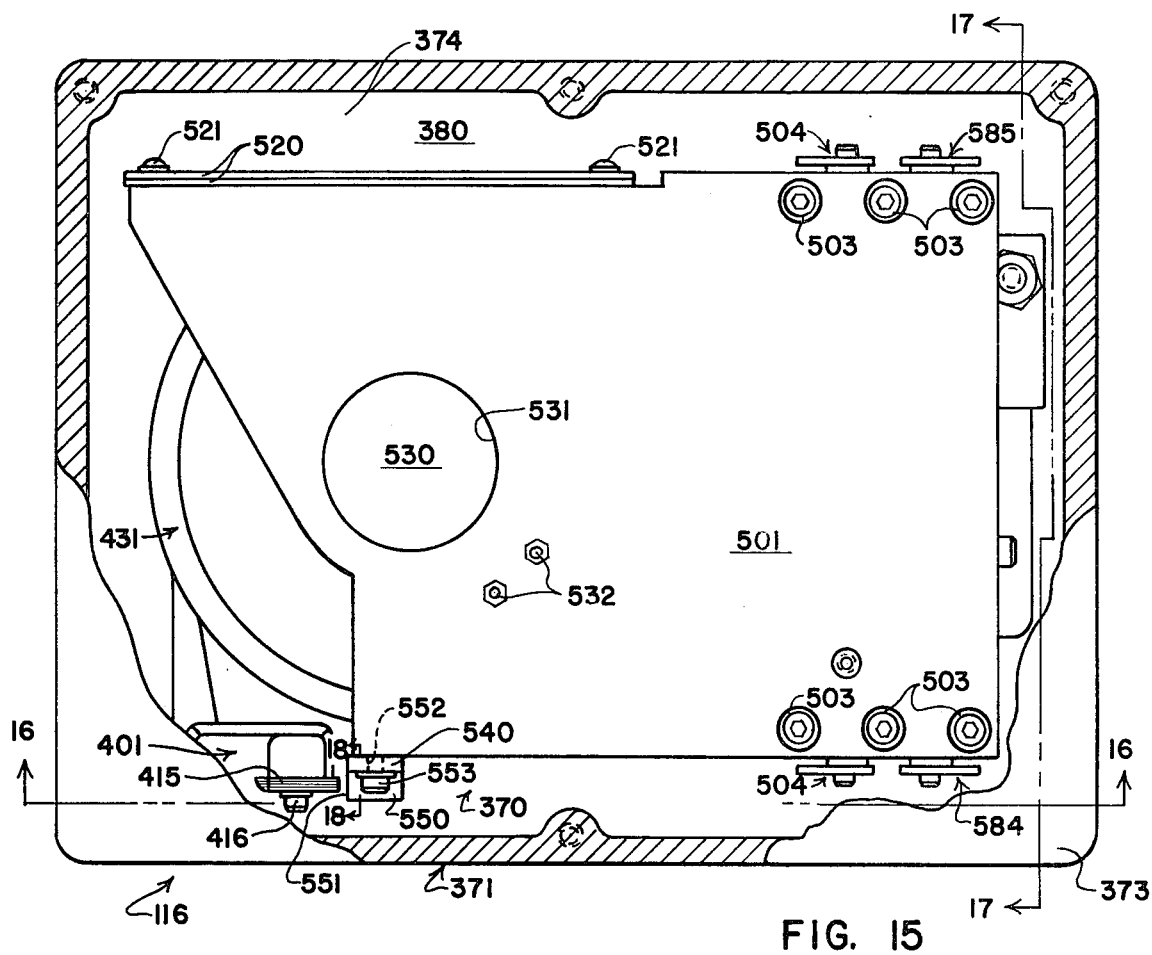
FIG. 15 is an enlarged top plan view of a weighing unit assembly employed in the apparatus of FIG. 1 with portions of the assembly being broken away.
Figure 16:
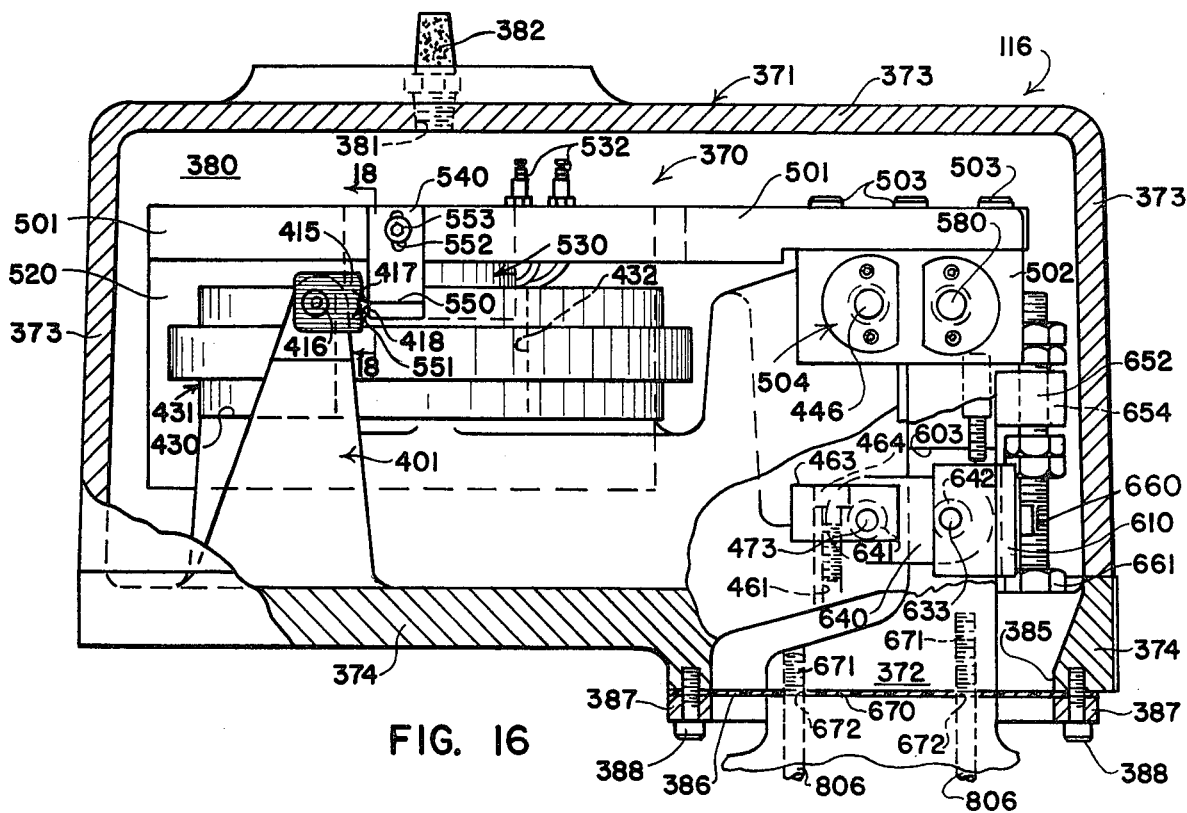
FIGS. 16, 17 and 18 are sectional views as seen from planes indicated by lines 16—16, 17—17 and 18—18 in FIG. 15.
Figure 18:
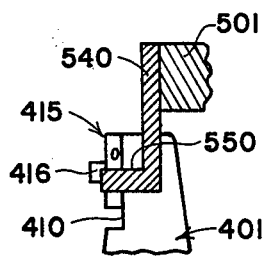
Figure 18A:
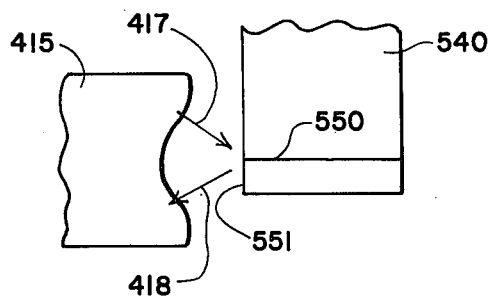
FIG. 18a is an enlarged view of a portion of the apparatus shown in FIG. 16.

Referring to FIGS. 15, 16, and 18a, a sensor 415 is mounted on the sensor mounting projection 401. A threaded fastener 416 extends through a mounting hole formed in the sensor 415 and is threaded into the hole 411 to clamp the sensor 415 into firm engagement with the mounting surface 410. In preferred practice, the sensor 415 is a self contained unit including a light emitting diode and a photo transistor. The diode in the sensor 415 is arranged to emit a beam of light as indicated by an arrow 417 in FIG. 18a. The photo transistor in the sensor 415 is arranged to provide a variation in an output signal in response to incident light traveling in a direction indicated by an arrow 418 in FIG. 18a. Such sensors are commerically available, one being sold under the designation SPX-1160-1 by Spectronics, Inc., Richardson, Tex., 75080.

Figure 22:
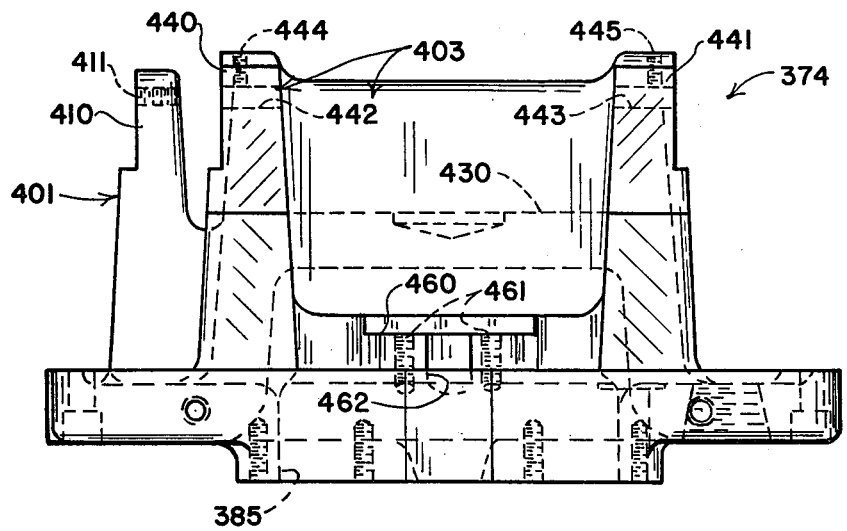

Referring to FIGS. 20–22, the magnet mounting projection 402 defines a round, horizontally extending mounting surface 430. Referring to FIG. 16, an annular permanent magnet 431 is mounted atop the surface 430. A hole 432 is formed centrally in the magnet 431.

Referring again to FIGS. 20–22, the balance beam mounting projection on 403 has two spaced mounting portions 440, 441. Aligned holes 442, 443 are formed through the portions 440, 441. Threaded holes 444, 445 are formed in the portions 440, 441 and intersect the holes 442, 443. Referring to FIG. 16, a balance beam pivot rod 446 extends through the holes 442, 443. Set screws, not shown, are threaded into the holes 444, 445 to hold the pivot rod 446 in place on the base structure 374.

Referring to FIG. 22, an upwardly facing machined recess 460 is formed in the base structure 374. Two threaded holes 461 are formed in the base structure 374 and open into the recess 460. A cast depression 462 is proivided between the threaded holes 461. Referring to FIG. 16, a pivot block 463 is positioned in the recess 460. Threaded fasteners 464 extend through holes formed in the pivot block 463 and are threaded into the holes 461.

Figure 22A:
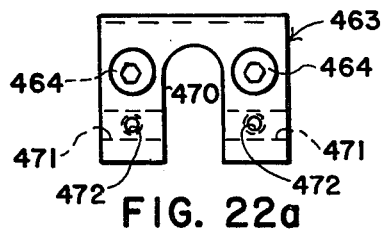
FIGS. 22a and 22b are top plan views of portions of the assembly shown in FIGS. 15-17.

Referring to FIG. 22a, the pivot block 463 has a centrally located recess 470 which aligns with the cast depression 462 formed in the base structure 374. A pair of aligned holes 471 are formed in portions of the pivot block 463 which border on opposite sides of the recess 470. A pair of threaded holes 472 intersect the aligned holes 471. Referring to FIG. 16, a pivot pin 473 extends through the holes 471. Set screws, not shown, are threaded into the holes 472 to hold the pivot pin 473 in position on the pivot block 463.

Referring to FIGS. 15–17, a balance beam 501 is pivotally mounted on the pivot rod 446. The balance beam 501 is a relatively thick metal plate which extends substantially horizontally through upper portions of the chamber 380. A pair of bearing blocks 502 are secured by threaded fasteners 503 to the forward end region of the balance beam 501. A pair of precision bearings 504 are carried by the bearing blocks 502 and journal opposite ends of the pivot rod 446 to pivotally mount the balance beam 501 on the base structure 374.

Four components are carried by the balance beam 501. As will be explained in greater detail, the armature 372 is pivotally mounted near the forward end of the beam 501. A plurality of weights 520, an electromagnetic coil 530, and an L-shaped target member 540 are rigidly mounted on rearward portions of the beam 501.

referring to FIGS. 15 and 16, the weights 520 are rectangular lead plates which assist in counterbalancing the load applied to the armature by the dead weight of the accumulation bucket 117. Threaded fasteners 521 extend through aligned holes formed in the weight plates 520 and are threaded into the balance beam 501 to securely mount the weight plates on the balance beam 501.

The electromagnetic coil 530 is a cylindrical assembly of conventional-design and is purchased commerically. A hole 531 is formed through the balance beam 501 to receive an upper end of the coil assembly 530. Suitable fasteners, not shown, securely fasten the coil 530 to the balance beam 501. A pair of electrical terminals 532 are carried on the beam and connect electrically with opposite ends of conductors which connect with the electromagnetic coil 530. Suitable conductors couple the terminals 532 to circuitry shown in FIG. 19, as will be explained.

Referring to FIGS. 16, 18 and 18a, the L-shaped target member 540 is a precision machined component having a horizontally extending surface 550 positioned in a plane which preferably includes the point of intersection of the arrows 417, 418. A rearwardly facing reflection surface 551 intersects the surface 550 along a line which preferably includes the point of intersection of the arrows 417, 418. A slot 552 is formed through the upstanding leg of the target member 540. A threaded fastener 553 extends through the slot 552 and rigidly mounts the target member 540 on the balance beam 501.

Figure 23:
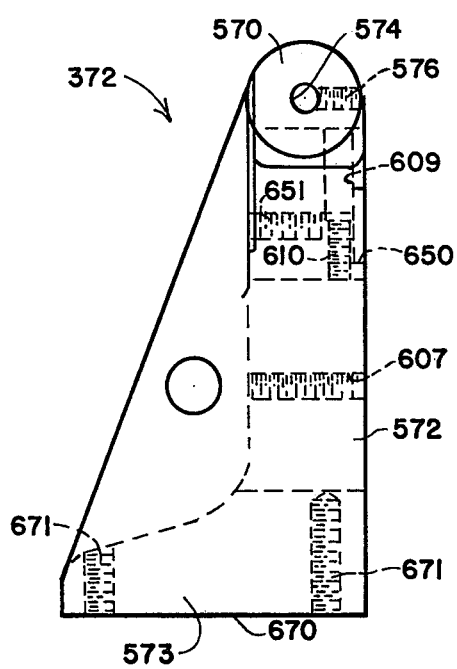
FIGS. 23 and 24 are side elevational views of an armature employed in the apparatus of FIG. 15.
Figure 24:
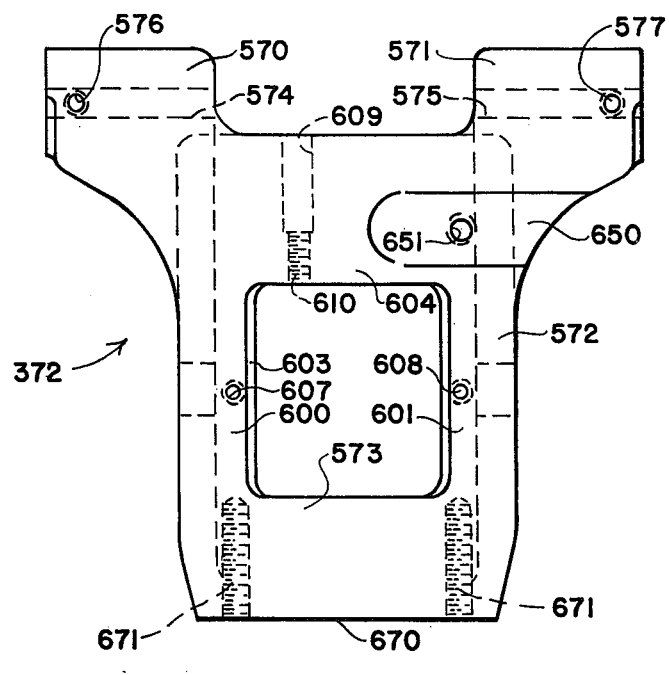

Referring to FIGS. 23 and 24, the armature 372 is a generally Y-shaped structure having a pair of spaced upwardly extending arms 570, 571 and a central stem 572 terminating in a lower end region 573. Aligned holes 574, 575 are formed through the arms 570, 571. A pair of threaded holes 576, 577 are formed in the arms 570, 571 and intersect the holes 574, 575. Referring to FIGS. 16 and 17, a pivot rod 580 extends through the holes 574, 575 and through aligned holes in the bearing blocks 502. Set screws 582, 583 are threaded into the holes 576, 577 and securely connect the pivot rod 580 to the armature 372. Precision bearings 584, 585 are carried by the bearing blocks 502, 503 and journal opposite ends of the pivot rod 580 to pivotally support the armature 372 on the balance beam 501.

Referring to FIGS. 23 and 24, the stem 572 of the armature 372 has a pair of spaced side portions 600, 601 which border opposite sides of a generally rectangular hole 603. An upper portion 604 borders the upper side of the hole 603. The lower portion 573 borders the bottom side of the hole 603. A pair of threaded holes 607, 608 are formed in the side portions 600, 601. A hole 609 having a threaded lower end region 610 is formed in the upper portion 604.

Referring to FIGS. 16 and 17, a yoke block 610 extends across the hole 603 and overlies the side portions 600, 601. A pair of slots 611, 612 are formed through the yoke block 610. Threaded fasteners 613, 614 extend through the slots 611, 612 and are threaded into the holes 607, 608 to rigidly mount the yoke block 610 on the armature 372. A set screw 615 is threaded into the hole 610 and engages an upper surface on the yoke block 610 to assist in positioning the yoke block 610 on the armature 372.

Figure 22B:
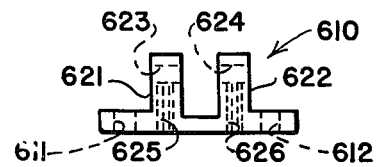

Referring to FIG. 22b, the yoke block 610 has a pair of spaced, rearwardly projecting arms 621, 622. Aligned holes 623, 624 are formed through the arms 621, 622. Threaded holes 625, 626 are formed in the yoke block 610 and intersect the holes 623, 624. Referring to FIG. 16, a pivot pin 633 extends through the holes 623, 624. Set screws, not shown are threaded into the holes 625, 626 and securely connect the pivot pin 633 to the yoke block 610.

Referring to FIG. 16, an elongated link 640 is pivotally mounted on the pivot pins 473, 633 and interconnects the pivot block 463 and the yoke block 610. The link 640 carries a pair of bearings 641, 642 which journal the pins 473, 633. The rearward end of the link 640 fits loosely in the aligned recess and depression 470, 462. The link 640 serves to guide the movement of the armature 372.

Referring to FIGS. 23, 24, a forwardly facing machined recess 650 is formed in the upper portion 604. A threaded hole 651 is formed in the upper portion 604 and opens into the recess 650. Referring to FIGS. 16, 17, a stop block 652 is positioned in the recess 650. A threaded fastener 653 extends through a hole formed in the stop block 652 and is threaded into the hole 651 to rigidly mount the stop block 652 on the armature 372. A vertically extending hole 654 is formed through the stop block 652. The hole 654 overlies the threaded hole 399 formed in the base structure 374.

A threaded rod 660 extends loosely through the hole 654 and is threaded into the hole 399. A lock nut 661 is threaded on to the rod 660 and is tightened into engagement with the base structure 374 to securely connect the threaded rod to the base structure 374. Upper and lower pairs of lock nuts 664, 665 are threaded onto the rod 660 on opposite sides of the stop block 652. The nuts 664, 665 operate as stops to limit the vertical travel of the armature 372. The range of vertical movement permitted by the stop nuts 664, 665 for the travel of the coil 530 is about one-eighth to three-sixteenths of an inch. When the weighing unit 116 is operating, however, the coil, in actuality, does not move more than about one one-thousandth of an inch.

Referring to FIGS. 23, 24, the lower end region 573 of the armature defines a flat, horizontally extending mounting surface 670. Four threaded holes 671 are formed in the lower end region 573 and open through the mounting surface 670. Referring to FIG. 16, aligned holes 672 are formed through the diaphragm. As will be explained, fasteners extend through the diaphragm holes 672 and are threaded into the armature holes 671 to mount the accumulator bucket 117 on the armature 372.

Figure 19:
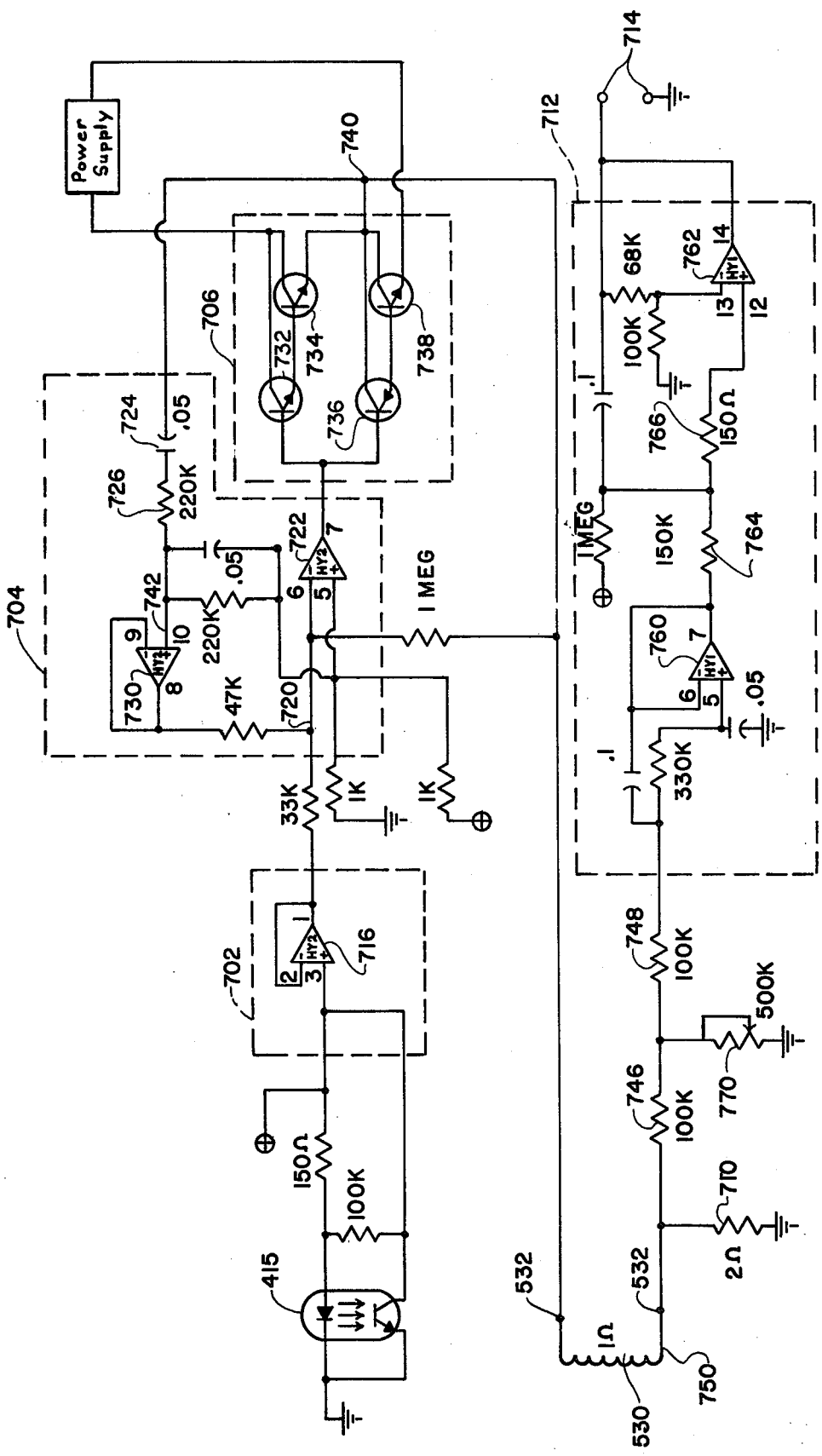
FIG. 19 is a schematic electrical circuit diagram of circuitry associated with the assembly of FIG. 15.

Referring to FIG. 19, circuitry embodying the signaling system 370 includes the sensor 415 and the electromagnetic coil 530. The signaling system 370 operates to provide a current to the coil 530 to maintain the armature 372 at a predetermined target level as articles accumulate in the bucket 117. The signaling system 370 does this by sensing the position of the armature 372 and by adjusting the current in the coil 530 to maintain the armature 372 at the target level. The signaling system 370 also senses the amount of coil current required to effect armature positioning. The required current is a function of the weight of articles in the bucket 117. This current is converted to an output signal indicating the weight of articles in the bucket 117.

The sensor 415 produces a signal indicating the deviation of the armature 372 from the target level. It does this by sensing resistance variations in the photoresistor of the sensor 415. These variations are caused by changes in the amount of light which originates in the light-emitting diode and which is reflected by the surface 551 toward the photoresistor of the sensor 415. The target element 540 is positioned by the balance beam 501 such that light from the diode of the sensor 415 impinges on the photoresistor of the sensor 415 when the armature 372 is located at or near its target level.

Referring to FIG. 18a a knife edge formed in the juncture of the target surfaces 550, 551 is positioned at the juncture of the arrows 417, 418 when the armature 372 is at its target level. If the armature 372 moves upwardly, the target element 540 moves downwardly presenting less of the reflecting surface 551 to reflect a lesser quantity of light in directions indicated by the arrow 418 toward the sensor 415. If the armature 372 moves downwardly, the target element 540 moves upwardly presenting more of the reflecting surface 551 to reflect a larger quantity of light in directions indicated by the arrow 418 toward the sensor 415. These variations in quantity of reflected light received by the sensor 415 produce corresponding variations in resistance in the sensor 415 and cause the sensor 415 to produce an output signal that represents the position of the armature 372.

The sensor 415 can accordingly be said to serve the function of indicating to the remainder of the signaling circuitry 370 the fact that deviations in armature positioning have occurred and current changes in the coil 530 are required to restore the armature to its predetermined level. By changing the current flowing through the coil 530, the magnetic force exerted by the coil 530 on the balance beam 501 is also changed causing the balance beam 501 to pivot as required to reposition the armature at its predetermined level.

The signaling circuitry 370 includes a delay damping system for rendering an output signal from the circuit relatively insensitive to minute changes in force exerted on the armature 372 resulting from the impact of individual product articles dropping into the bucket 117. The circuit also contains filtration circuitry for negating the electrical effect of mechanical vibrations on the bucket caused by nearby vibratory feeding equipment and the like.

Referring to FIG. 19, the sensing circuitry includes a voltage follower amplification section 702 connected to receive an output signal from the sensor 415, a delay damping amplification section 704, and transistor drive circuitry 706 for producing an output current to the coil 530. The current through the coil 530 is measured precisely by a measuring resistor 710. The measured signal is passed through an active filtration system 712 to filter out the electrical effects of mechanical vibrations transmitted to the armature 372 by surrounding feeding equipment and the like. The filtered output is presented across a pair of terminals 714. The signal appearing at the terminal 714 has a value which is an accurate function of the weight of articles which have accumulated in the bucket 117.

The amplification section 702 includes an operational amplifier 716 connected to receive the output from the sensor 415 at a non-inverting input terminal. The output from the amplifier 716 is impressed on the delayed damping amplification section 704 by means of a lead 720 extending to an inverting input terminal of an operational amplifier 722. The amplification section 704 includes a negative feedback loop between the output and the inverting input of the amplifier 722 incorporating delay circuitry. The feedback loop includes a capacitor 724, a resistor 726, and an operational amplifier 730. The output of the amplifier 722 is directed to the transistor drive circuitry 706. The transistor drive circuitry 706 includes a set of power transistors 732, 734, 736 and 738. The transistor drive circuitry 706 amplifies the output signal from the amplifier 722 and transmits this signal to a terminal 740.

The output from the terminal 740 is directed through the series connected capacitor 724 and resistor 726, to a non-inverting input terminal 742 of the amplifier 730. The output of the amplifier 730 is directed onto the lead 720, which, as mentioned above, transmits this signal to the inverting input terminal of the amplifier 722. The effect of the delay feedback capacitor 724 renders the output of the amplifier 722 relatively insensitive to small, rapid variations in the signal from the sensor 415 caused by the impact of articles dropping into the bucket 117.

The signal appearing at the terminal 740 is connected to actuate the coil 530 to move the armature 372 toward a level approximating the predetermined level established by the arrangement of the target element 540 and the sensor 415. The signal appearing on the terminal 740 is directed through the coil 530 and subsequently proceeds by way of two series connected resistors 746, 748 to an input of the active filtration section 712. The precision resistor 710 is connected to the lower terminal 750 of the coil 530 to receive a major portion of the current through the coil, and to indicate the magnitude of that current by the voltage appearing at the terminal 752. This voltage precisely indicates the amount of current flowing through the coil 530 and is then applied to the active filtration section 712.

The active filtration system 712 includes two operational amplifiers 760, 762 connected to produce an output at the terminal 714. This output is a function of the voltage appearing at the terminal 752 and which has been filtered free of variations resulting from relatively high frequency mechanical vibrations in the system. The signal from the right-hand terminal of the resistor 748 is directed to the non-inverting input of the amplifier 760. The output of the amplifier 760 is directed through resistors 764, 766 to the non-inverting input terminal of the operational amplifier 762. The output from the operational amplifier 762 is then directed to the ungrounded one of the terminals 714. As shown in FIG. 19, the filtration section 712 represents an active, low pass filtration circuit having a pass band extending between approximately 12 and 15 Hz.

Circuitry is also provided to calibrate the voltage appearing at the terminal 752, indicating coil current, to correct for variations in circuit element values, imprecision, drift, etc. This function is performed by a potentiometer 770, connected between ground and the intersection between the resistors 746, 748. In practice, the potentiometer 770 is adjusted, with the bucket 117 empty, to provide a desired "zero" reading on the output signal appearing at the terminals 714.

The Accumulator Bucket 117

Figure 25:
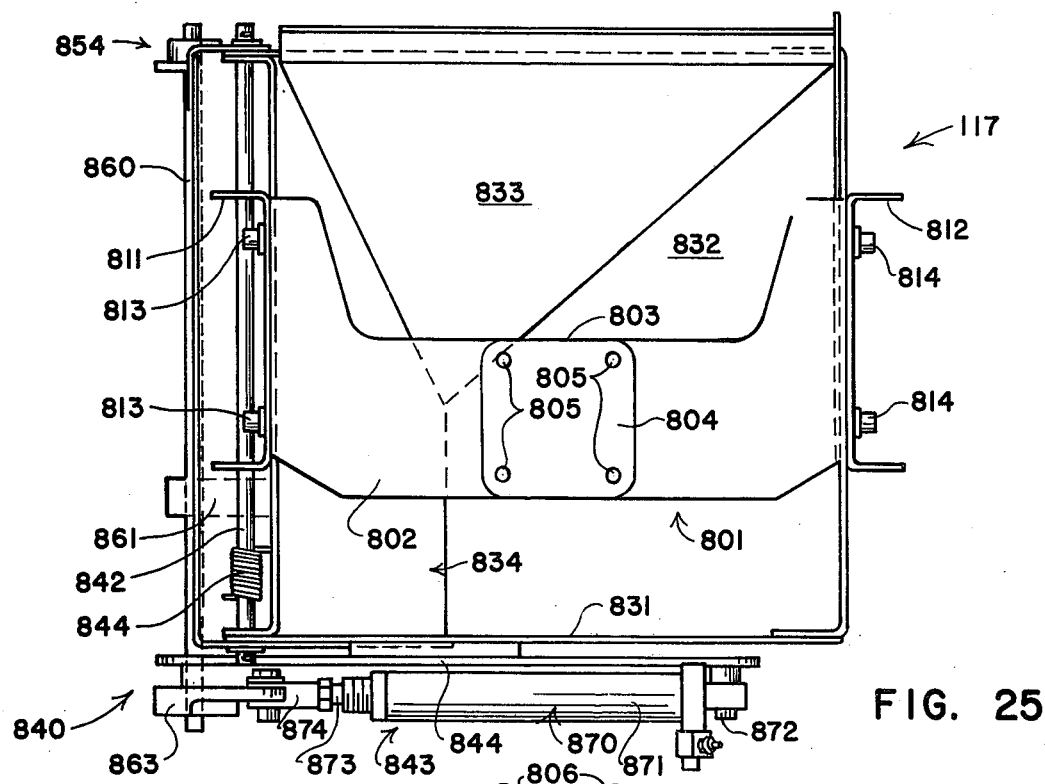
FIG. 25 is a top plan view of a weighing bucket assembly employed in the apparatus of FIG. 1.
Figure 26:
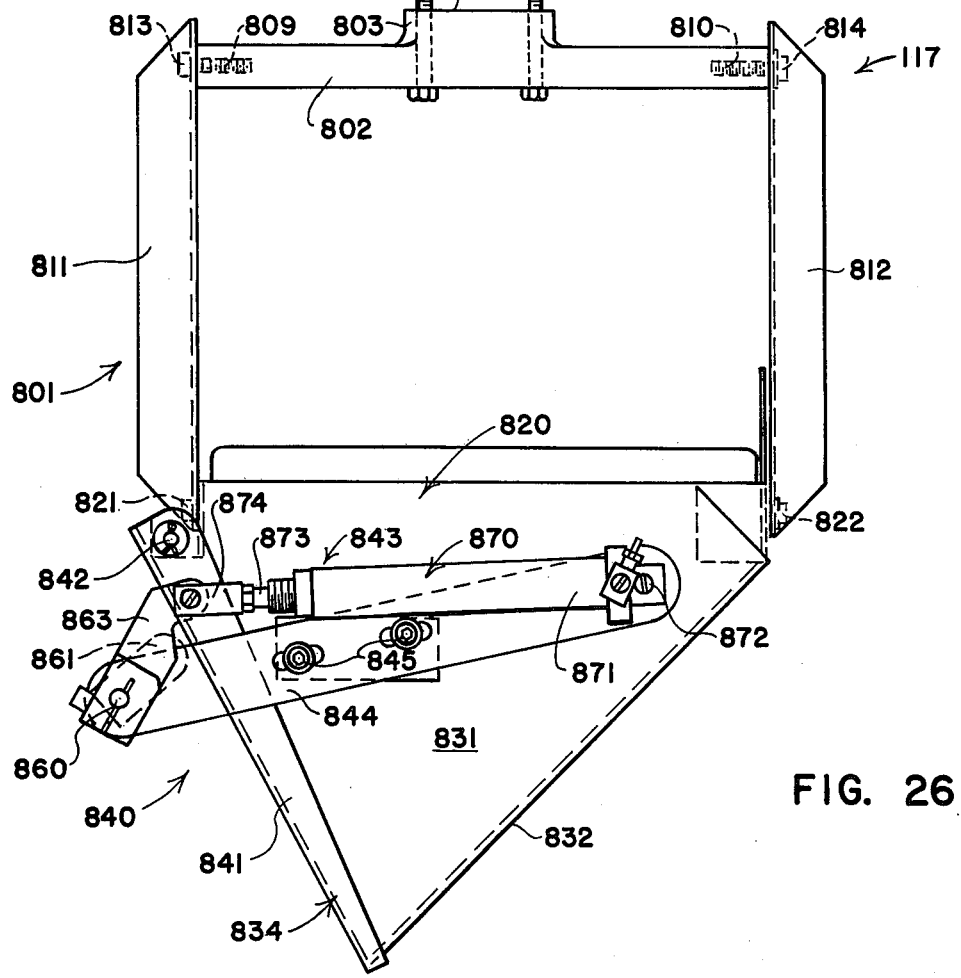
FIG. 26 is a front elevational view of the assembly shown in FIG. 25.

Referring to FIGS. 25, 26, the accumulator bucket 117 includes a hanger assembly 801. The hanger assembly 801 includes an upper mounting member 802. An upstanding formation 803 is provided at a central location on the mounting member 802. A flat, upwardly facing mounting surface 804 is provided atop the formation 803. Four holes 805 extend through the formation 803 and open through the mounting surface 804. Four threaded fasteners 806 extend through the holes 805.

Referring to FIG. 16, the fasteners 806 extend through diaphragm holes 672 and are threaded into the armature holes 671. The fasteners 806 are tightened to clamp the diaphragm 386 between the mounting surfaces 670, 804 and rigidly mount the bucket 117 on the armature 372.

Referring to FIG. 26, threaded holes 809, 810 are formed in opposite ends of the member 802. A pair of upstanding support arms 811, 812 have their upper ends positioned in engagement with the ends of the member 802. Threaded fasteners 813, 814 extend through holes formed in the arms 811, 812 and are threaded into the holes 809, 810 to securely connect the arms 811, 812 and the mounting member 802.

Figure 27:
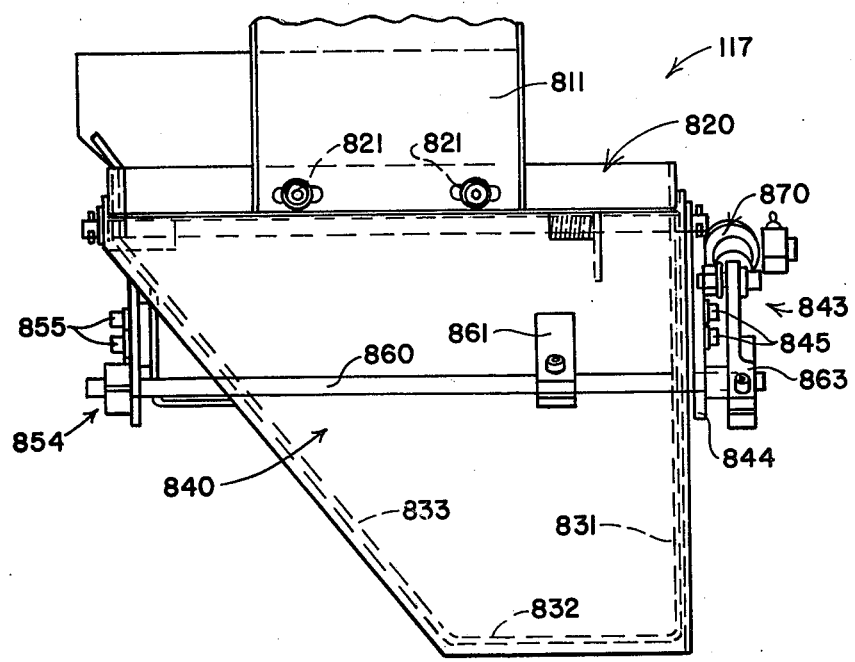
FIG. 27 is an enlarged side elevational view of the assembly of FIG. 25.

Referring to FIGS. 25–27, a receptacle 820 is supported by the arms 811, 812. Threaded fasteners, 822 extend through aligned holes formed in the arms 811, 812 and formed in opposite sides of the receptacle 820 to support the receptacle 820 on the arms 811, 812.

The receptacle 820 has a front wall 831 and inclined bottom walls 832, 833 which define the sides and bottom of a discharge opening 834. A closure assembly 840 is provided to selectively open and close the discharge opening 834.

The closure assembly 840 includes a door 841, a pivot pin 842 which pivotally mounts the door on the receptacle 820, and a power operated actuator assembly 843 for opening and closing the door 841. A torsion coil spring 844 is carried on the pivot pin 842 and biases the door 841 toward a position where the door 841 closes the opening 834.

The actuator assembly 843 includes a bracket assembly 844 on the forward side of the receptacle 820, and a bracket assembly 854 on the rearward side of the receptacle 820. Threaded fasteners 845, 855 mount the bracket assemblies 844, 854 on the receptacle 820. A door actuator shaft 860 has its opposite ends journaled by the bracket assemblies 844, 854. A door engaging arm 861 is rigidly connected to the shaft 860 and operates to hold the door 841 closed when the shaft 860 is in the position shown in FIGS. 25–27. A shaft positioning lever 863 is secured to the forward end of the shaft 860.

A pneumatic cylinder 870 connects with the bracket assembly 844 and with the positioning lever 863 to rotate the shaft 860 and selectively permit the door 841 to open, or to close. The cylinder has a housing 871, one end of which is pivotally connected to the bracket assembly 844 by a threaded fastener 872. An extensible piston 873 projects from the opposite end of the housing 871 and is pivotally connected by a yoke assembly 874 to the lever 863. When the piston rod 873 extends from the cylinder housing 871, as when pressurized air is supplied to the cylinder 870, the shaft 860 is rotated to a position where the arm 861 will permit the door 841 to open. If articles are present in the receptacle 820, gravitational forces acting on such articles will cause the door 841 to open to permit the articles to discharge through the opening 834.

The Control Unit 118

The control unit 118 is of the general type described in the referenced Dispenser Patent and governs the operation of the vibratory feeder 113 in response to a signal from the weighing unit circuitry 370. In operation, the control unit 118 causes the bulk discharge door 241 to open at the initiation of a feeding operation to rapidly deliver articles into the bucket 117. The control unit 118 causes the door 241 to close when the weight of articles in the bucket 117 begins to approach a predetermined level which has been set on the control unit 118. When the sensed weight of articles in the bucket 117 more closely approaches the predetermined weight, the control unit 118 slows the feeding action of the feeder 113. When the weight sensed by the signalling unit 370 equals the predetermined weight the control unit 118 stops the feeding action of the feeder 113. A suitable actuator button, not shown, is provided on the control unit 118 to operate the accumulator door cylinder 870 when a weighted batch of articles has accumulated in the bucket 117.

Geometry of the Apparatus 100

Significant advantages are obtained from the type and arrangement of components employed in the apparatus 100.

Substantially all of the components are of modular configuration. The supply hopper 111, the vibratory conveyor 112, the vibratory feeder 113, the feeder hopper 114, the level switch assembly 115, the weighing unit 116 the accumulator bucket 117, and the control unit 118 are each form separate modules that can be removed and installed with ease to facilitate servicing and assembly of the apparatus 100.

An additional feature of the described modular arrangement of components is that it facilitates the substitution of a counting unit for the weighing unit 116. As will be most easily appreciated by referring to the referenced Article Handling System With Dispenser patent application, the weighing unit module 116 can be replaced by a counting unit module to convert the apparatus 100 from a batch weighing apparatus to a batch counting apparatus.

Still other advantages obtain from arrangement of components in the apparatus. Referring to FIG. 1, it will be seen that the supply hopper 111, the vibratory conveyor 112, the feeder hopper 114 and the accumulator bucket 117 are all arranged in series along an imaginary line 900. As the line 900 passes from the vibratory conveyor 112 to the feeder hopper, it is near the intersection of the side members 131, 132 and the bracing members 134, 135. By this arrangement of components, the weight of the supply hopper 111 and the vibratory conveyor 112 together with the weight of articles in the supply hopper 111 and in the vibratory conveyor 112 helps to counterbalance the weight of the dispenser 113 and the weighing unit 116 and such articles as are in the dispenser 113 and in the weighing unit 116.

The in-line arrangement of components permits the accumulator bucket 117 to be positioned substantially forwardly of the frame side members 131, and forwardly of the stand 121. The substantial overhang thus provided for the accumulator bucket 117 permits the bucket 117 to overhang large containers or other feeding or packaging apparatus without requiring a specially configured chute to effect an interface with such equipment.

Operation of the Apparatus 100

In operation, articles to be dispensed in weighed batches are loaded into the supply hopper 111. A desired weight of articles to be included in each batch is set on the control console 126. The level switch assembly 115 is set to provide a desired level of articles in the feeder hopper 114. Since the level of articles in the feeder hopper 114 is below the reference level set on the switch knob 325, the vibratory conveyor 112 begins to operate to deliver articles into the feeder hopper 114. The level switch 115 then regulates the operation of the vibratory conveyor 112 to maintain the desired level articles in the feeder hopper 114.

The vibratory feeder 113 operates to deliver articles to both of the discharge openings 225, 226. A "bucket empty" signal generated by the weighing unit 116 causes the bulk feed door 241 to open permitting articles to discharge rapidly into the accumulator bucket 117. As the weight of articles in the bucket 117 begins to approach the desired weight set on the control unit 118, the weighing unit signal reaches a magnitude that causes the door 241 to close. As a dribble feed of articles continues to discharge into the bucket 117 causing the weight of articles in the bucket 117 to more closely approach the desired weight, the weighing unit signal reaches a magnitude that causes the operation of the feeding unit 113 to be slowed to provide a slow single file feed of articles into the bucket 117. Once the desired weight is reached, the signal from the weighing unit 116 reaches a magnitude that causes feeder operation to stop. The bucket door 841 is then opened to discharge the weighed batch of articles, and the feeding cycle is repeated to weigh a subsequent batch of articles for dispensing.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and the scope of the invention as hereinafter claimed.

What is claimed is:

1. An apparatus for forming batches of articles, comprising:
   a. an upstanding base structure;
   b. a vibratory feeder having a bowl-shaped feeder hopper for feeding articles from a hopper base portion upwardly along an inclined ramp toward a discharge station;
   c. article supply means including an article support and drive means for driving the article support to feed articles into the feeder hopper; and,
   d. electrical control means for generating an output signal to selectively start or stop the drive means to maintain a predetermined level of articles in the base of the feeder hopper, including:
      i. electrically operated sensor means for sensing the level of articles in the feeder hopper and for generating an electrical input signal representative of the sensed level of articles in the feeder hopper;
      ii. a manually operated electrical control means for generating an electrical reference signal representative of a desired predetermined level for articles to be maintained in the feeder hopper;
      iii. comparison means connected to the sensor means and to the control for receiving and comparing the input and reference signals and for generating an output signal indicative of when the actual sensed level of articles is above and below the desired predetermined level.

2. The apparatus of claim 1 wherein the sensor means includes a pivotally mounted elongate rod having one rod end supporting means for engaging upper surfaces of articles in the feeder hopper, and electrical transducer means connected to said rod for generating the input signal with a value representative of the position of said rod.

3. The apparatus of claim 2 wherein said electrical transducer means pivotally mounts said rod and is responsive to pivotal movement of said rod to generate the corresponding input signal.

4. The apparatus of claim 2 wherein said means for engaging the upper surfaces of articles in the feeder hopper comprises a wiper blade having an arcuate portion, said wiper blade being supported by said rod so that said arcuate portion presents a convex surface to the upper surfaces of said articles.

5. The apparatus of claim 2 wherein said rod is pivotally mounted intermediate its ends and wherein the outer rod end supports counterbalance means for adjustably balancing the rod and controlling biasing of the engaging means into contact with said upper surfaces.

6. The apparatus of claim 1 further comprising weighing means including an accumulator receptacle for collecting articles which have passed through the discharge station and for generating an output signal representative of the weight of such collected articles.

7. The apparatus of claim 1 wherein the control includes a potentiometer having a rotatable stem and a knob for rotating the potentiometer stem to adjust the resistance of the potentiometer to a value indicative of the desired predetermined level.

8. The apparatus of claim 1 wherein the comparison means includes an operational amplifier for providing a higher level output signal when the sensed actual level of articles in the feeder hopper is below the desired predetermined level than when the sensed actual level is at or above the predetermined level.

9. The apparatus of claim 8 additionally including light emitting signal means for connection to the operational amplifier for providing a visual indication to an operator when the sensed actual level is below the desired predetermined level.

* * * * *